(12) United States Patent
Haynes et al.

(10) Patent No.: US 9,975,280 B2
(45) Date of Patent: *May 22, 2018

(54) FORMING APPARATUS

(71) Applicant: Manufacturing Systems Limited, Whangaparaoa, Auckland (NZ)

(72) Inventors: Andrew Leo Haynes, Red Beach (NZ); Christopher John Nicholls, Northshore (NZ); Gabriel Ioan Giurgiu, Glenfield (NZ); Samuel Gwynn Buckingham, West Harbour (NZ)

(73) Assignee: Manufacturing Systems Limited, Auckland (NZ)

( * ) Notice: Subject to any disclaimer, the term of this patent is extended or adjusted under 35 U.S.C. 154(b) by 643 days.

This patent is subject to a terminal disclaimer.

(21) Appl. No.: 14/562,338

(22) Filed: Dec. 5, 2014

(65) Prior Publication Data

US 2015/0314492 A1    Nov. 5, 2015

Related U.S. Application Data

(63) Continuation of application No. 13/754,021, filed on Jan. 30, 2013, now Pat. No. 8,926,883, which is a (Continued)

(30) Foreign Application Priority Data

Nov. 16, 2005 (NZ) ........................... 543629
Oct. 18, 2006 (NZ) ........................... 550637

(51) Int. Cl.
B29C 43/00 (2006.01)
B29C 43/06 (2006.01)
(Continued)

(52) U.S. Cl.
CPC .............. *B29C 43/00* (2013.01); *B29C 43/06* (2013.01); *B30B 11/14* (2013.01); *B29C 47/003* (2013.01);
(Continued)

(58) Field of Classification Search
CPC ....... B29C 43/00; B29C 43/06; B29C 43/003; B29C 43/004; B29C 43/0054; B29C 2043/3283; B29C 2043/5833
(Continued)

(56) References Cited

U.S. PATENT DOCUMENTS 3,776,679 A    12/1973  Hegler
4,021,178 A     5/1977  Braun
(Continued)

FOREIGN PATENT DOCUMENTS

CN    2642497 Y    9/2004
FR    2565155 B1   12/1985
(Continued)

*Primary Examiner* — Christina Johnson
*Assistant Examiner* — Xue Liu
(74) *Attorney, Agent, or Firm* — Foley & Lardner LLP

(57) ABSTRACT

A method of forming a material includes presenting a formable material to a space between opposing forming surfaces of opposed forming tools from when said material is carried as said opposing forming surfaces advance in a machine direction. The method includes pressurizing, as said opposing forming surfaces advance, said material between said opposing forming surfaces in a reduced space between said opposing forming surfaces defining at least in part a pressure forming zone, said reduced space between said opposing forming surfaces being maintained constant until a form of at least one of said opposing forming surfaces is profiled into said material and is retainable thereon. The method also includes releasing the profiled material from between the said opposing forming surfaces, as the space of (Continued)

the pressure forming zone increases between said opposing forming surfaces as the opposing forming surfaces advance.

31 Claims, 37 Drawing Sheets

Related U.S. Application Data continuation of application No. 12/085,163, filed as application No. PCT/NZ2006/000301 on Nov. 16, 2006, now abandoned.

(51) Int. Cl.
  *B30B 11/14* (2006.01)
  *B29C 47/00* (2006.01)
  *B29C 43/32* (2006.01)
  *B29C 43/58* (2006.01)

(52) U.S. Cl.
  CPC ........ *B29C 47/004* (2013.01); *B29C 47/0054* (2013.01); *B29C 2043/3283* (2013.01); *B29C 2043/5833* (2013.01)

(58) Field of Classification Search
  USPC ........................................................ 264/319
  See application file for complete search history.

(56) References Cited

U.S. PATENT DOCUMENTS

| | | |
|---|---|---|
| 4,319,872 A | 3/1982 | Lupke |
| 4,449,910 A | 5/1984 | Leloux |
| 4,789,322 A | 12/1988 | Chan |
| 4,956,140 A | 9/1990 | Rolles et al. |
| 5,053,180 A | 10/1991 | Wang et al. |
| 5,320,797 A | 6/1994 | Hegler |
| 5,458,477 A | 10/1995 | Kemerer |
| 6,457,965 B1 | 10/2002 | Hegler |
| 6,908,295 B2 | 6/2005 | Thielman et al. |
| 6,644,951 B2 | 4/2007 | Hofmann |

FOREIGN PATENT DOCUMENTS

| | | |
|---|---|---|
| GB | 1221127 A | 2/1971 |
| GB | 2134844 A | 8/1984 |
| JP | 2000-296544 | 10/2000 |
| JP | 2002-347042 | 12/2002 |
| JP | 2003-067625 | 3/2003 |
| JP | 2003-288635 | 10/2003 |
| WO | WO 95/00025 | 1/1995 |
| WO | WO 02/096614 | 12/2002 |
| WO | WO 2007/058549 | 5/2007 |

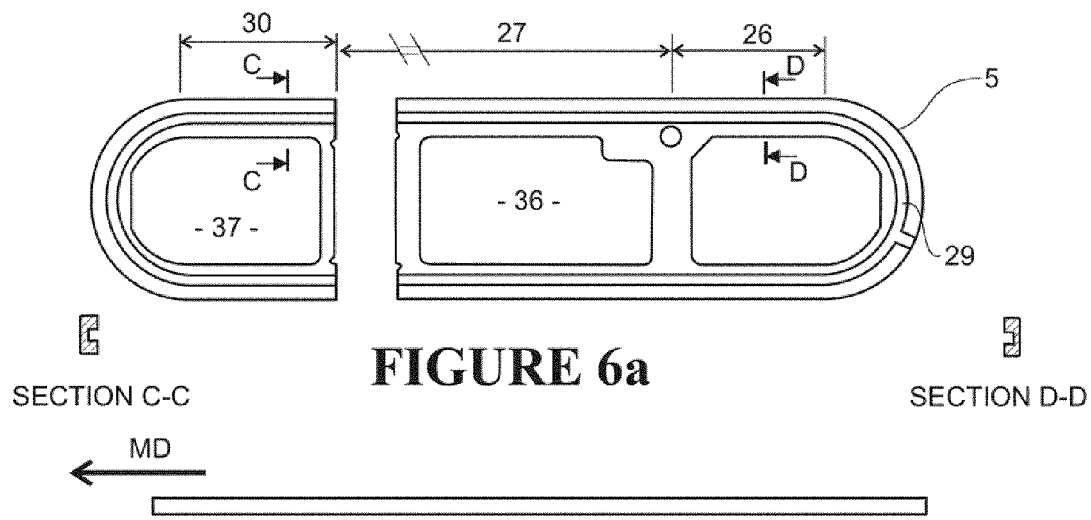
FIGURE 6a
SECTION C-C  SECTION D-D
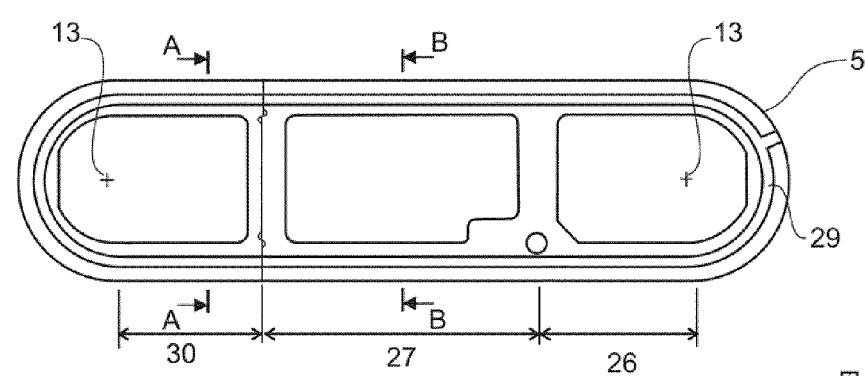
FIGURE 6b
FIGURE 6c
SECTION A-A  SECTION B-B
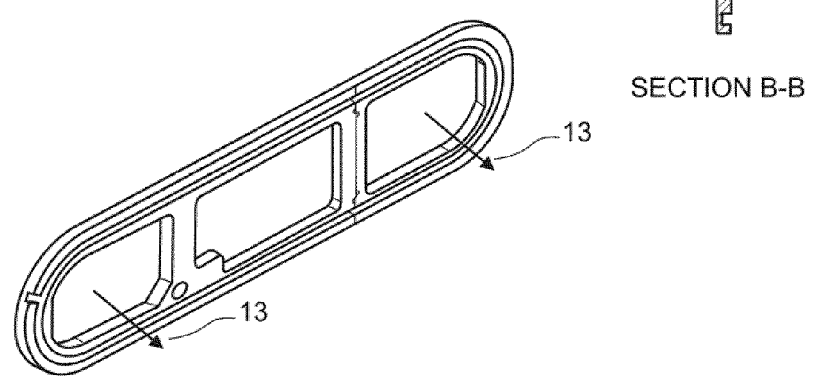
FIGURE 6d

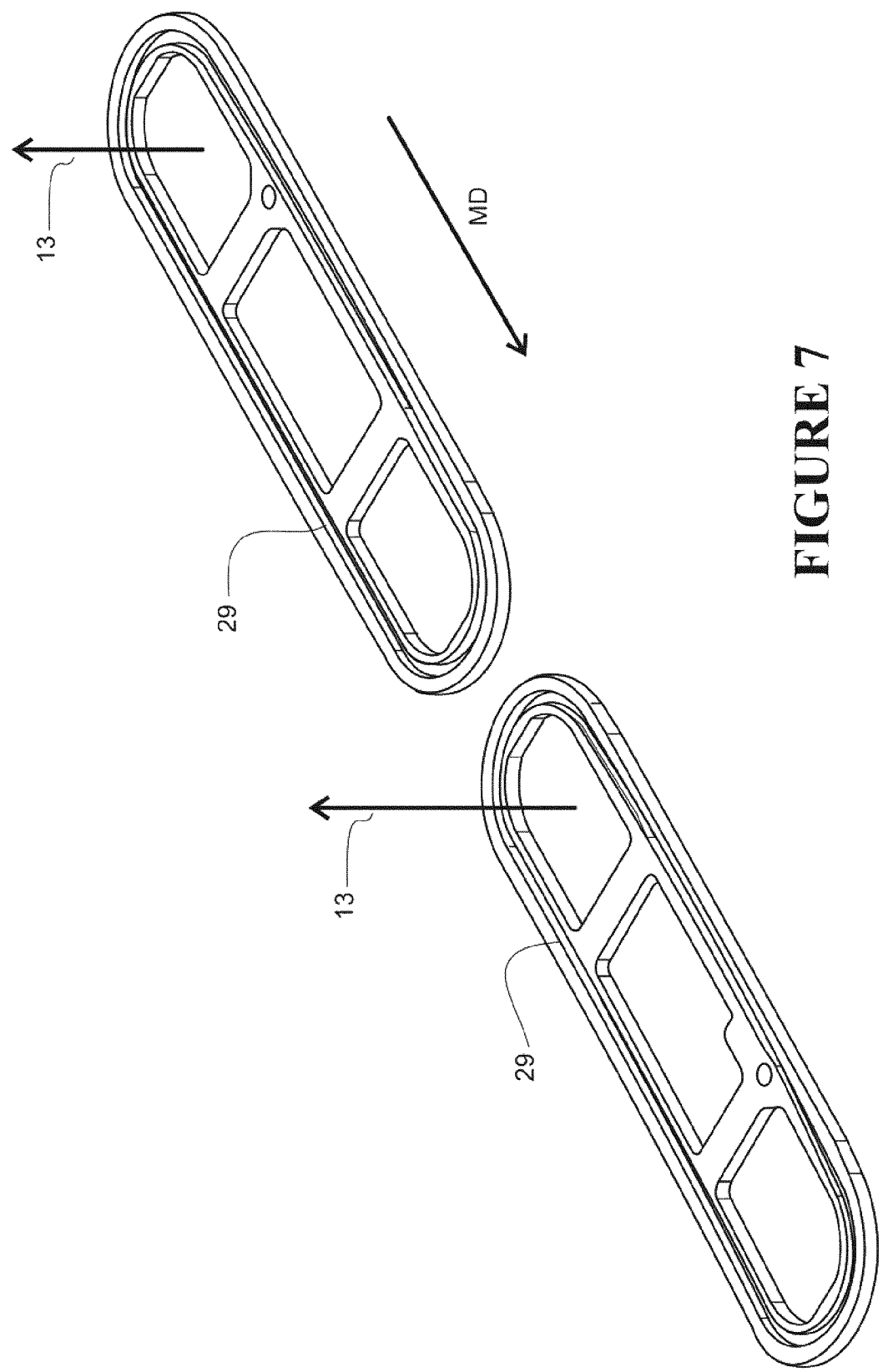

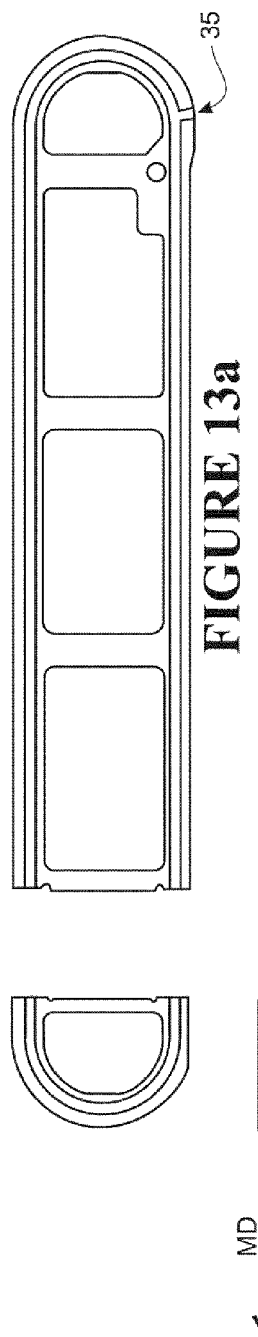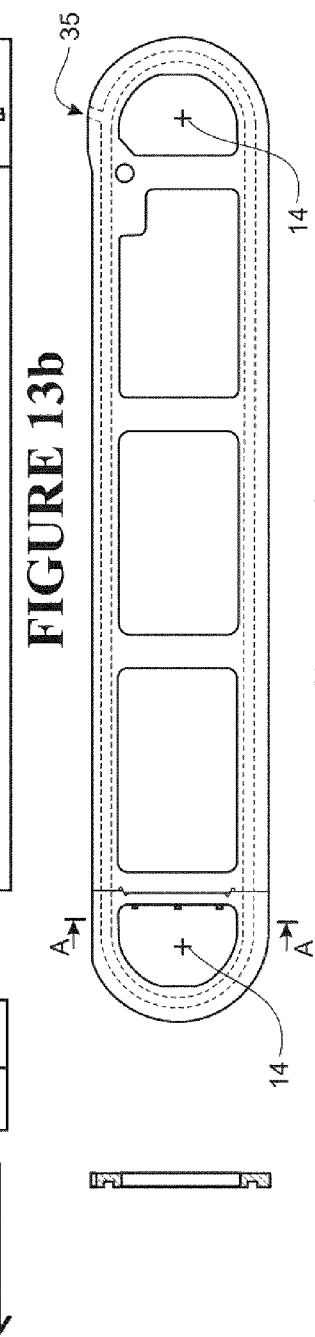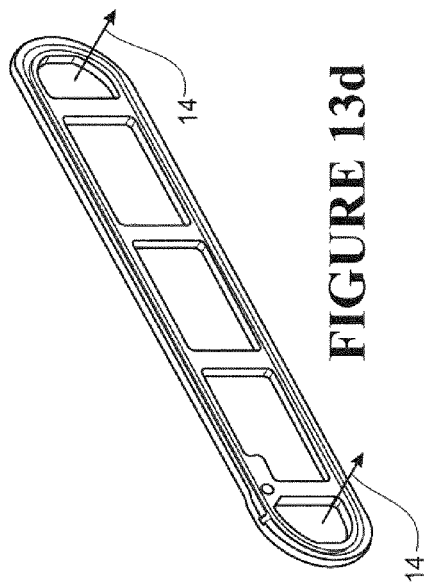

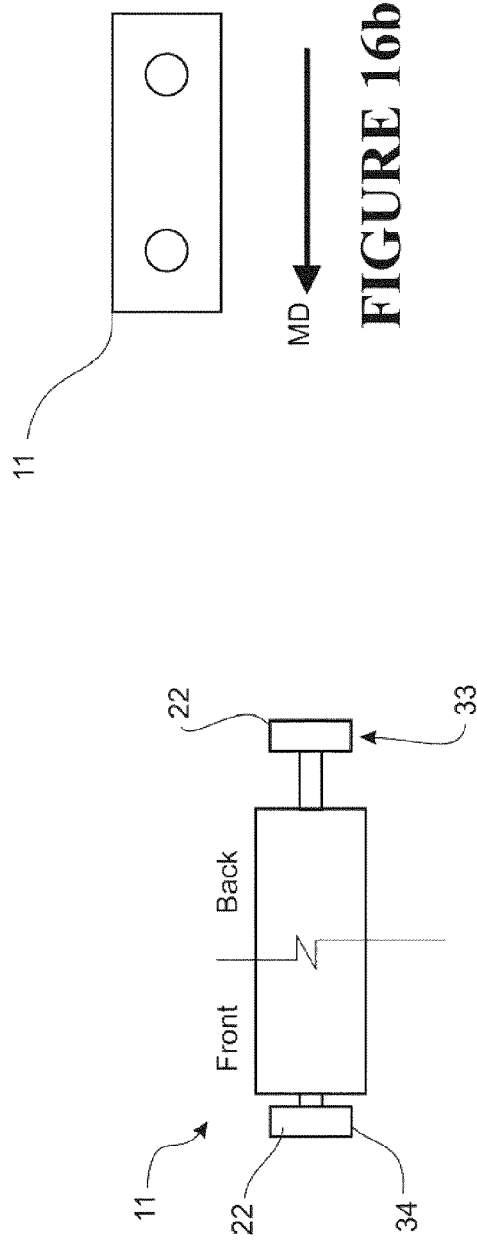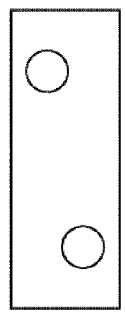
FIGURE 16b
FIGURE 16c
FIGURE 16d
FIGURE 16a

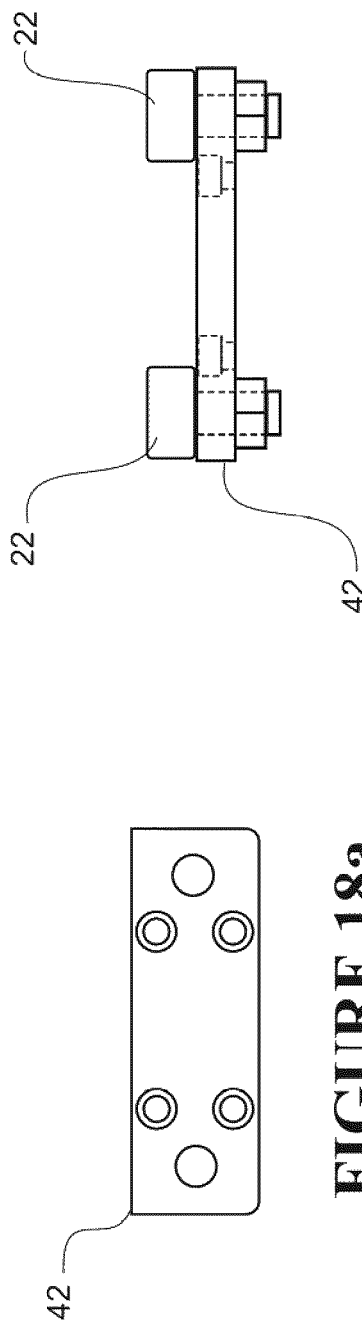
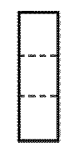
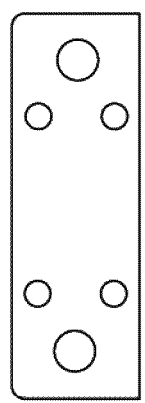
FIGURE 18d
FIGURE 18e
FIGURE 18a
FIGURE 18b
FIGURE 18c

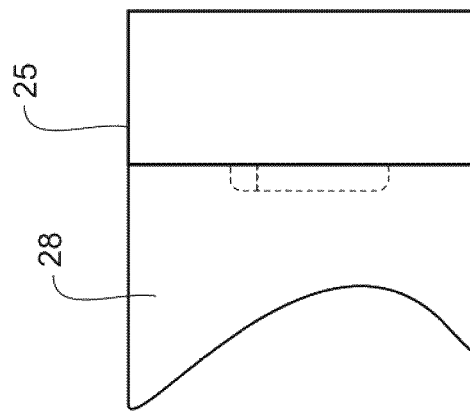
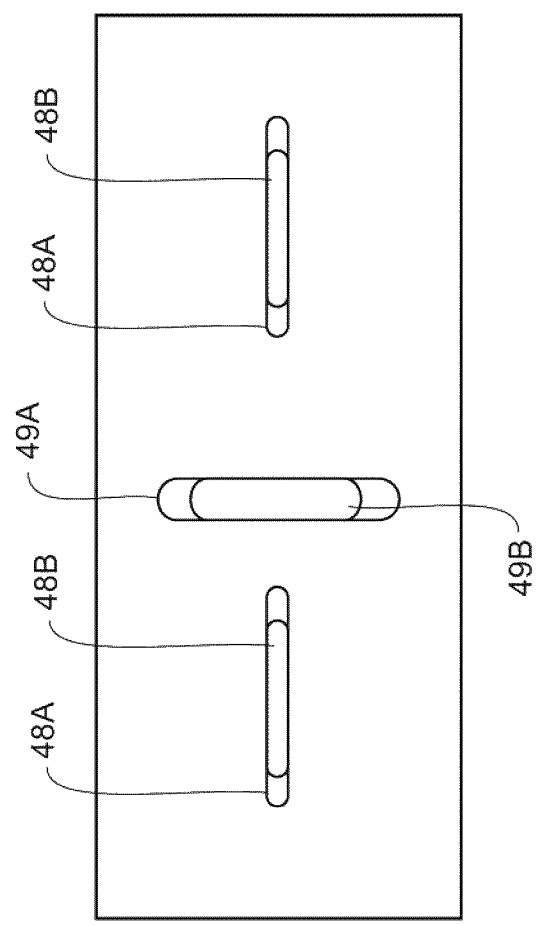
FIGURE 19c
FIGURE 19b

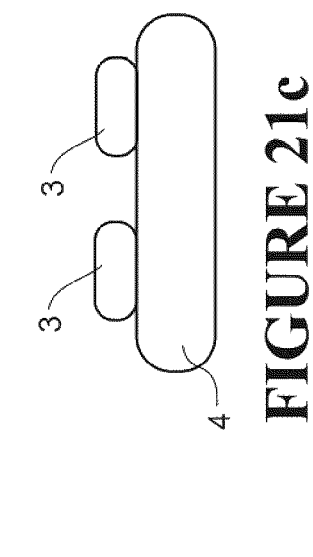
FIGURE 21b
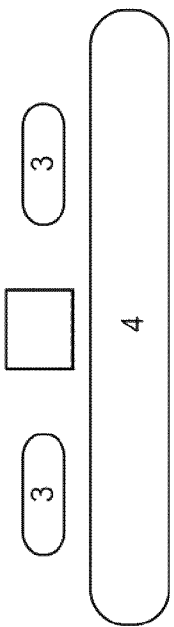
FIGURE 21c
FIGURE 21e
FIGURE 21g
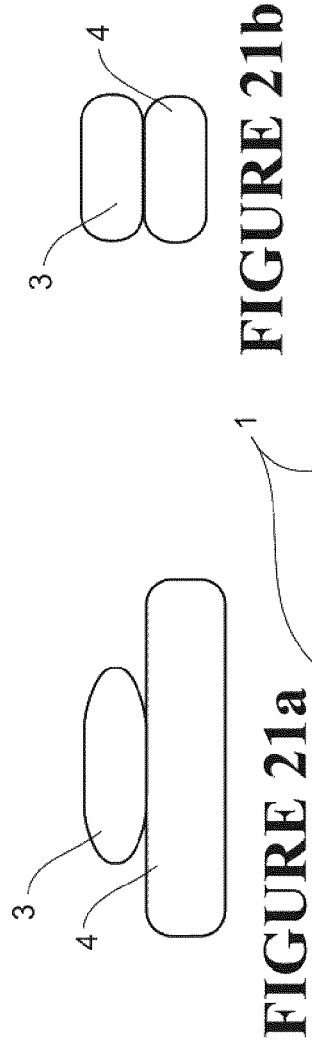
FIGURE 21a
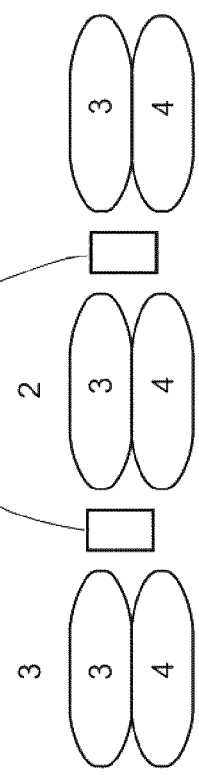
FIGURE 21d
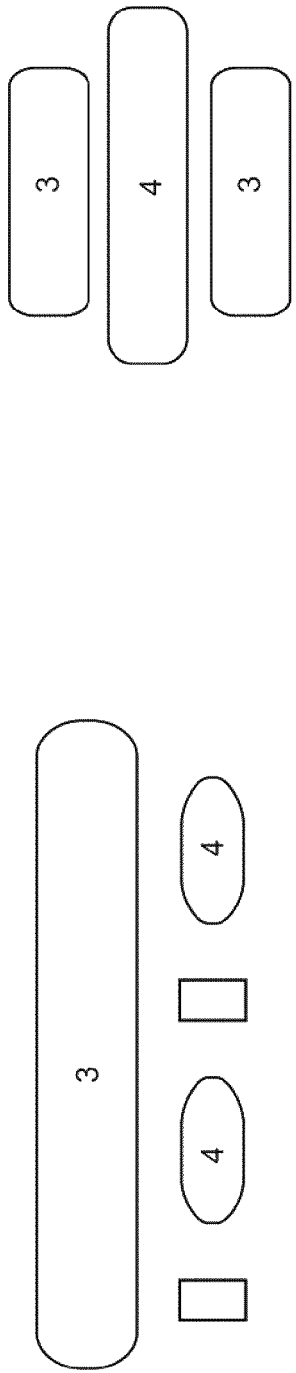
FIGURE 21f

FORMING APPARATUS

CROSS-REFERENCE TO RELATED APPLICATIONS

This Application claims the benefit of priority to U.S. patent application Ser. No. 13/754,021, having a filing date of Jan. 30, 2013, which claims the benefit of priority to U.S. patent application Ser. No. 12/085,163, having a filing date of Jul. 21, 2009, international patent application number PCT/NZ2006/000301, having a filing date of Nov. 16, 2006, which claims the benefit of priority to New Zealand Patent Application No. 550637, having a filing date of Oct. 18, 2006, and which claims the benefit of priority to New Zealand Patent Application No. 543629, having a filing date of Nov. 16, 2005, the complete disclosures of which are hereby incorporated by reference for all purposes.

FIELD OF INVENTION

This invention relates to forming apparatus for materials and to the products that can be formed from the apparatus.

BACKGROUND OF THE INVENTION

A difficulty with forming of different kinds (whether under pressure alone such as drawing (deep or shallow) and imprinting, or pressure and temperature such as injection moulding, blow moulding, extrusion, vacuum forming, thermoforming, pressure forming, compression moulding (e.g. for rubber or cross-linkable materials) vacuum forming in conjunction with material extrusion, thermoforming in conjunction with extrusion and/or vacuum forming, calendaring and post processing and similar forming processes) is the need to ensure an ability for the apparatus (i) to meet tolerances required,
(ii) to be brought to its operating conditions without fouling,
(iii) to be operated whether at operating temperature(s) or not without destructive interferences, and
(iv) to be brought to the forming zone (preferably a pressure zone) with or without any tracked or guided movement opening and then closing gaps that capture unwanted material.

It is to at least some of those features (i) to (iv) that the present invention is in some aspects directed.

A difficulty, for example, in mating or co-acting dies or other forming tools ("forming tools") is the prospect of undesired gaps and variations in orientation over the forming zone (hereafter "pressure forming zone"). This is irrespective of whether or not the forming tools simply receive material under pressure (e.g. injection moulding) or apply pressure to a material not being introduced under pressure (e.g. extrusion and then thermoforming), or some hybrid thereof, as there is the prospect of material being entrapped between adjacent forming tools and thereby giving rise to inferior production and excessive stresses and pressure(s) in the system. Any progression of forming tools about a curve will affect orientations and interferences. For example a prior art method (or alternative) of moving consecutive or continuous forming tools into position is shown in FIG. 3a (for example a pipe forming caterpillar). The forming tools are attached on a continuous linkage, for example conveyor belt chain or otherwise, and are driven about the circuit. As they come in to meet with each other a nip point A is formed between consecutive forming tools prior to them coming into parallel alignment. The presence of such a nip point creates, as can be appreciated, problems and join lines in the finished product.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is to features of thermal control and/or fouling prevention that in some aspects the present invention is directed. It is an additional or alternative object of the present invention to provide forming apparatus able to be operated on a continuous or substantially continuous basis by providing requisite pressures over a pressure forming zone between co-acting forming tools or at least to provide the public with a useful choice.

BRIEF DESCRIPTION OF THE INVENTION

In a first aspect the present invention may be said to broadly consist in a method of forming a material, said method comprising or including the steps of (i) presenting a formable material to a space (whether substrated by, interposed by and/or associated with other material or materials, or not), (hereafter "material") from whence said material can be carried by and/or between opposing surfaces, as said opposing surfaces advance in an advancing direction, (ii) pressurising, as said opposing surfaces advance, said material between said opposing surfaces in a reduced space between said opposing surfaces defining at least in part a pressure forming zone, said reduced space between said opposing surfaces being maintained at least substantially constant until such time as the form of at least one of said opposing surfaces is profiled into said material and is retainable thereon, and (iii) releasing the now profiled material from between the said opposing surfaces, as the space increases between said opposing surfaces as the surfaces advance, wherein each of said opposing surfaces, or at least one said such surface, is provided by one or more forming tool(s) of a series of forming tools being advanced about its own guiding circuit, and wherein as said forming tools present in a zone to pressurise or release said material there is preferably no gap between adjacent said forming tools at least where they contact said forming material, and the relative movement between adjacent tools of at least one of said set of forming tools over said zone is only towards the forming tools of said other opposing surface Preferably said guiding circuit is endless.

Alternatively said guiding circuit is interrupted.

Preferably each of said opposing surfaces is provided by one or more forming tool(s) of a series of forming tools.

Preferably each of said forming tools is advanced at least in part by driving of said forming tool by a driving means through said pressure forming zone.

Preferably said driving action is via a motor whether hydraulic, electronic or otherwise.

Preferably each of said series of forming tools is advanced by at least in part shunting by a trailing forming tool through said pressure forming zone where the step (ii) pressurising takes place.

Preferably in said pressure forming zone, where the step (ii) pressurising takes place, each of said forming tools is supported on one or more guide tracks acting on two axes of each said forming tool on its flanks transverse to said advancing direction, thereby to present reproducibly said forming tool, insofar as orientation is concerned, in said pressure forming zone.

Preferably in said guiding circuit, the, or both series of forming tools, is, or are, advanced serially about said guiding circuit by each said forming tool being pushed over at least part of said guiding circuit under a drive action directly on just one or a few of said forming tools.

Preferably in said guiding circuit, the or both series of forming tools, is permitted, by a differential of locus of said guide tracks at each flank of each forming tool at one or more zone to vary from the mutual condition of adjacent fowling tools required through the pressure forming zone.

Preferably in said pressure forming zone where the step (ii) pressurising takes place, one series of forming tools present surfaces downwardly whilst an underlying series of forming tools present surfaces upwardly.

Preferably the forming tools of the underlying series of forming tools, when in said pressure forming zone where the step (ii) pressurising takes place, are each supported from underneath or optionally from the sides.

Preferably said at least one series of tools is profiled to imprint the profile of a liquid crystal display ("LCD").

Preferably said at least one series of tools is profiled to imprint the profile of a photovoltaic cell.

Preferably said at least one series of tools is profiled to imprint the profile of a text profile in said material.

Preferably said material is introduced together with a further material, whether formable or not.

Preferably said material is a plastic material.

Preferably said material is introduced in a liquid or semi-liquid form.

Preferably said material is introduced in an extruded form.

Preferably each of the two series of said forming tools is profiled to imprint the profile of a liquid crystal display ("LCD").

Preferably said profile is imprinted one side of said material.

Preferably said profile is imprinted on both sides of said material.

Preferably said forming tool is a composite of at least one carrier tool that runs in or on said one or more guide tracks and at least one surface tool to provide at least one of said opposing surfaces, said surface tool mounted to or from said carrier tool to be carried thereby.

Preferably each forming tool, or said carrying tool carrying said surface tool, has at least two distinct follower sets, one set engaged only during when said tool is in the pressure forming zone, a further set thereafter used to guide said tool about the remainder of said one or more guide.

Preferably there are multiple said pressure forming zones with said material being further treated in between said multiple pressure forming zones.

Preferably in addition material or materials are added between or in said pressure forming zones.

In a second aspect the present invention may be said to broadly consist in a forming apparatus for forming a formable material or materials ("material(s)"), said apparatus comprising or including, a first set of dies or forming tools ("first forming tool set"), a second set of dies or forming tool ("second forming tool set"), each die or tool ("forming tool") of said second forming tool set being adapted to co-act with one or more die or tool ("forming tool") of said first forming tool set, or vice versa, to form a co-acting forming tool in a pressure forming zone, a first forming tool set guide or guides ("first guide(s)") about which said first forming tool set can be moved about a first circuit, a second forming tool set guide or guides ("second guide(s)") about which said second forming tool set can be moved about a second circuit, at least one primary drive ("first drive") to move, in serial progression said forming tools of said forming tool sets about said guide(s), in a machine direction, wherein, at least on part of said circuit, immediately before or after (hereafter "lead zone") said pressure forming zone, adjacent forming tools of one said forming tool set are movably supported such that the only relative movement of said adjacent forming tools is towards or away (hereafter said "motion") from the forming tools of the other said forming tool set with which they co-act.

Preferably said motion occurs prior to ("lead-in zone") said pressure forming zone, relative to said machine direction.

Preferably said motion occurs after ("lead-out zone") said pressure forming zone, relative to said machine direction.

Preferably in said lead zone both said forming tool sets are movably supported to undergo said motion towards each other.

Preferably there is a temperature control system provided for at least one of said forming tools sets.

Preferably said temperature control system controls the temperature about said forming tools.

Preferably at least said pressure forming zone is temperature controlled by said temperature control system(s).

Preferably said temperature control system can raise and/or elevate said temperatures above or below the ambient temperature.

Preferably one of said forming tool sets moves about a circuit whose circuit axis is at 90° to the circuit axis of the other circuit of forming tool sets.

Preferably said axes of support run in tracks in said guides via a rolling axis or a guided pivot axis.

Preferably there are at least two guides for each said forming tool set.

Preferably one each of said at least two guides is located either side of said forming tools of a said forming tool set.

Preferably said guides can be locked in position relative to one another.

Preferably in said opposing surfaces can apply from 0.0 kg/cm2 to 250 kg/cm2 to said material therebetween.

Preferably said opposing surfaces can move from 0.0 m/min to 300 m/min said machine direction.

Preferably said opposing surfaces can imprint a texture into said material from 1 micrometer up to 10 meters.

In a third aspect the present invention may be said to broadly consist in a forming apparatus for forming a formable material or materials ("material(s)"), said apparatus comprising or including, a first set of dies or forming tools ("first forming tool set"), a second set of dies or forming tool ("second forming tool set"), each die or tool ("forming tool") of said second forming tool set being adapted to co-act with one or more die or tool ("forming tool") of said first forming tool set, or vice versa, to form a co-acting forming tool in a pressure forming zone, a first forming tool set guide or guides ("first guide(s)") about which said first forming tool set can be moved about a first circuit, a second forming tool set guide or guides ("second guide(s)") about which said second forming tool set can be moved about a second circuit, at least one primary drive ("first drive") to move, in serial progression said forming tools of said forming tool sets about said guide(s), in a machine direction, wherein, at least on part of said circuit, immediately before or after (hereafter "lead zone") said pressure forming zone, adjacent forming tools of one said forming tool set are movably supported such that the only relative movement of said adjacent forming tools is towards or away (hereafter said "motion") from the forming tools of the other said forming tool set with which they co-act.

Preferably said motion occurs prior to ("lead-in zone") said pressure forming zone, relative to said machine direction.

Preferably said motion occurs after ("lead-out zone") said pressure forming zone, relative to said machine direction.

Preferably in said lead zone both said forming tool sets are movably supported to undergo said motion towards each other.

Preferably there is a temperature control system provided for at least one of said forming tools sets.

A forming apparatus as claimed in claim 9 wherein said temperature control system controls the temperature about said forming tools.

Preferably at least said pressure forming zone is temperature controlled by said temperature control system(s).

Preferably said temperature control system can raise and/or elevate said temperatures above or below the ambient temperature.

Preferably one of said forming tool sets moves about a circuit whose circuit axis is at 90° to the circuit axis of the other circuit of forming tool sets.

Preferably said axes of support run in tracks in said guides via a rolling axis or a guided pivot axis.

Preferably there are at least two guides for each said forming tool set.

Preferably one each of said at least two guides is located either side of said forming tools of a said forming tool set.

Preferably said guides can be locked in position relative to one another.

In a further aspect the present invention may be said to broadly consist in an apparatus for forming a formable material or materials that include at least one formable material, ("material(s)"), said apparatus comprising or including, a first set of dies or die forming tool bolsters ("first forming tool set"), a second set of dies or die or forming tool bolsters ("second forming tool set"), each die or tool ("forming tool") of the second forming tool set being adapted to co-act with one or more die or tool ("forming tool") of the first forming tool set, or vice versa, in a pressure forming zone, a first forming tool set guide or guides ("first guide(s)") about which the first forming tool set can be moved about a first circuit, a second forming tool set guide or guides ("second guide(s)") about which the second forming tool set can be moved about a second circuit, a first drive to move in serial progression the tools of said first forming tool set about the first guide(s), a second drive to move in serial progression the tools of said second forming tool set about the second guide(s), wherein there is a constant referenced relationship of co-acting forming tools, one of each set, over said pressure forming zone during which they are advanced (hereafter "in the machine direction"), and wherein one (and preferably both) of said drives and its guide(s) shunts or drives the tools of its forming tool set as they are each supported on two axes transverse to said machine direction, such axes each being selected from a rolling axis or a guided pivot axis, so that in at least part of said circuit(s) one axis follows a different locus to the other thereby to allow proximate forming tools on said circuit(s) to be held in, or not to be held in, the same orientation relative to the machine direction.

Preferably at least one of said guides, and preferably each of the guides, is of one or more tracks and a roller glide or other follower of one of said axes of each forming tool follows that whilst the other follows the other.

It is to be understood that such following of the forming tools in or on the guides can be achieved by many ways which fall within the scope of the present invention. For example but not limited to roller engagement (whether bearinged, bushed or otherwise), sliding engagement, linear beatings, cam followers and other means known in the art.

In one embodiment the roller, glides and/or other follower bear on a surface distinct from that on which they otherwise bear as a consequence of gravity effects being overcome at least when the dies are under operative pressure.

Optionally, but preferably for thermoforming, the guide(s) over the pressure forming zone provide a pinching effect as the dies progress into and/or through the pressure zone.

In another aspect the invention is apparatus for forming a formable material or materials that include at least one formable material, ("material(s)"), said apparatus comprising or including a first set of dies or die forming tool bolsters ("first forming tool set"), a second set of dies or die or forming tool bolsters ("second forming tool set"), each die or tool ("forming tool") of the second forming tool set being adapted to co-act with one or more die or tool ("forming tool"), or vice versa, of the first forming tool set in a pressure forming zone, a first forming tool set guide or guides ("first guide(s)") about which the first forming tool set can be moved about a first circuit, a second forming tool set guide or guides ("second guide(s)") about which the second forming tool set can be moved about a second circuit, a first drive to move in serial progression the tools of said first forming tool set about said first guide(s), a second drive to move in serial progression the tools of the second forming tool set about the second guide(s), Preferably there is a second said primary drive to move in serial progression said forming tools of said second forming tool set about said second guide(s).

Preferably there is a temperature control system to control at least the forming tools to a temperature or temperatures in an operating range or to maintain such temperature(s), or both.

Preferably there is a constant referenced relationship of (I) co-acting forming tools, one or more of each set, as well as (II) to and in advance or following forming tool of the same die set over said pressure forming zone during which they are advanced in the machine direction.

Preferably the guide(s) include curves about which a die can be urged by a following die, the following die not being linked to the more advanced die (with respect to the machine direction) other than by their associations with their guide(s).

The temperature control can be heating, cooling or both (e.g. heating followed by cooling to provide form holding or cooling followed by heating (optionally with subsequent cooling)). Such control may be achieved actively by heating and cooling circuits which are controlled (e.g. by electronic sensing and driving means) or may be inherent in the material selection such that for example excess heat is conducted away, or retained.

Preferably there is at least one pressure plate on one side of said pressure forming zone to bear on the forming tools in said pressure forming zone to increase the pressure applied by said forming tool to said material(s).

Preferably there are two said pressure plates a first pressure above said pressure forming zone and a second pressure plated below said pressure forming zone.

Preferably adjacent forming tools of said sets are locked to each other by a first locking means at least over said pressure forming zone.

Preferably co-acting forming tools of said sets are locked to each other by a second locking means at least over said pressure forming zone.

Preferably said first locking means is by a pin and slot engagement.

Preferably said second locking means is by a Morse taper engagement.

Preferably one (and preferably both) of said drives and its guide(s) shunts or drives said forming tools of its forming tool set as they are each supported on two axes ("axes of support") transverse to said machine direction, such axes each being selected from a rolling axis or a guided pivot axis, so that in at least part of said circuit(s) one axis follows a different locus to the other thereby to allow proximate forming tools on the circuit(s) to be held in or not to be held in the same orientation relative to said machine direction.

Preferably at least one of said guides, and preferably each of said guides, is of two tracks and a roller, glide and/or other follower of one of said two axes transverse of each forming tool follows that whilst the other follows the other.

In one embodiment said roller, glide and/or other follower bears on a surface distinct from that on which they otherwise bear as a consequence of gravity effects being overcome at least when the forming tools are under operative pressure in said pressure zone.

Optionally, but preferably for thermoforming, the guide(s) over the pressure forming zone provide a pinching effect as the forming tools progress into and/or through the pressure forming zone.

In any of the aforementioned apparatus the first and second forming tool set ("tool(s)") operate in a plane so that one set of forming tools presents down onto or toward the other set of forming tools over the pressure forming zone. In other forms of the present invention however (for example as for injection moulding or the like) preferably or optionally the first and second forming tool set ("tool(s)") are such as to present the forming tools of the respective sets to each other over a pressure forming zone where the sets are side by side when considered with respect to the horizontal or vertical. Other options including presenting from any direction or directions.

Preferably said forming tools at the commencement of the pressure forming zone present (without any tool to tool gaps likely to entrap material) stepwise in an otherwise aligned condition relative to each other.

Preferably said stepwise alignment follows a locus of movement.

Preferably said locus of movement is linear and angled toward said opposing co-acting forming tool.

Alternatively said locus of movement is away and/or toward said opposing co-acting forming tool and may follow a linear or curved locus of movement.

Preferably where the movement upwards or downwards of any one forming tool is greater than its actual thickness, such that it would not normally engage its neighbouring blocks (both before and after), then block extensions are present to increase the height of the block and the interface surface that it has with its neighbouring blocks such that the overall apparent height of the block is greater than that of the upward or downward movement it undertakes.

In some forms of the present invention the means by which materials can be introduced may be before the pressure forming zone onto dies of either forming tool set.

Preferably said guide(s) include disparate loci for two tracks or the equivalent to guide each axis of a said forming tool.

Preferably said two tracks are at each end of the forming tool such that there are two tracks at each end.

Alternatively said two tracks engage via said a roller, glide and/or follower on a surface or surfaces external to said forming surface (for example the sides of said forming tool, the back of said forming tool or similar).

Preferably there are more than two guides presenting to said forming tools. For example there may be one either side of said forming tool and an additional guide running on the centre of said forming tool to provide additional pressure in said pressure forming zone.

Preferably the roller, glide or other follower (preferably one at each side of said forming tool of one of said axes of support of said forming tool is differently distanced from the forming tool proper with respect to the other roller, slide and/or other follower (preferably one at each side of said forming tool) for the other axis of said axes of support the same forming tool thereby to allow separate tracking Preferably the arrangement is such that there is little, if no, gap to allow material ingress between adjacent forming tools in a set of forming tool as it is moved through the pressure forming zone.

Preferably however the circuit of a or each forming tool set allows gaps to be opened and closed around curves as a result of the slightly different action of the relevant guide(s) on the roller, glide and/or other follower on each of said axes of support.

Preferably through said pressure forming zone, each forming tool does not vary in its orientation with respect to its mating or co-acting forming tool nor relative to at least one of its own set of forming tools which is immediately there adjacent.

Preferably said forming tools are of a kind that vary in dimension responsive to temperature and preferably there is sufficient play in the mounting of the forming tools to allow them, when brought up or down to operating temperature, to meet the aims of the present invention.

Preferably said forming tools have reinforced areas where they locate against adjacent and/or co-acting forming tools.

Preferably the mounting of said surface tool to or from said carrier tool is one that allows the surface tool to thermally expand relative to the carrier tool or vice versa.

Preferably even when not up to operating temperature there are no material capturing gaps before and after said pressure forming zone and preferably, where there may be extrusion of molten materials onto one of the forming tool sets prior to the pressure forming zone, that zone of that die set leading to the pressure zone.

Preferably there is provided a temperature control system to bring the forming tool sets to an operating temperature. Preferably there is a temperature control system (e.g. heating and/or cooling) that can maintain the forming tool at an operating temperature during use.

Preferably the temperature systems are one and the same and preferably each relies on a temperature controlled working fluid (for example air, gas or liquid). Preferably said temperature is monitored.

Preferably any temperature control system provided is for one or preferably both sets of forming tools and, as such, each forming tool of the set can be brought to and/or be kept at operating temperatures or temperature profile at least over said pressure forming zone.

Preferably at least one of the forming tool sets and its guide can be moved relative to the other forming tool set and its guides (e.g. under the action of a pneumatic, electric or hydraulic system between frames supporting said guides) so as to effect "opening" or "closing" of the forming tools and forming surfaces of said pressure zone. There optionally can be locking in a closed condition. Closing, in the case of thermoforming or some forms of forming, may merely mean to its effective co-acting distance of said forming tool sets.

Preferably at least one and preferably both sets of forming tools are advanced by a serial engagement of each newly presented forming tool by the drive which then urges the accumulated dies into said pressure forming zone.

Preferably said primary drives drive said forming tools immediately prior to said pressure forming zone.

Preferably each said forming tool is individually driven.

Preferably said forming tools are each individually driven or alternatively driven by a drive or drives on the circuit.

Preferably there is at least one secondary drive to aid said primary drive, for example in overcoming friction between said guides and said forming tools.

Preferably said at least one secondary drive feeds forming tools to said primary drive via said guides.

Preferably said forming tool is a composite of at least one carrier tool that runs in or on said one or more guide tracks and at least one surface tool to provide at least one of said opposing surfaces, said surface tool mounted to or from said carrier tool to be carried thereby.

Preferably the mounting of said surface tool to or from said carrier tool is one that allows the forming tool to thermally expand relative to the carrier tool or vice versa. For example if for surface tools are more of, say aluminum and carrier tools are of, say, steel the surface tool will expand differently to the carrier tool.

Degrees of freedom between the surface tool and its carrier tool are provided by keying which allows such relative expansion of the two.

In another aspect the invention consists in a forming machine of a kind that co-acts forming tools to provide a three dimensional or two dimensional form to a material or materials introduced under pressure and/or to be pressed in a zone ("tool co-acting zone") between moving and mating or co-acting forming tools, wherein each said forming tool advances a series of such tools about its own guiding circuit, and wherein in the at least one tool to at least one tool co-acting zone, each said forming tool is controlled as to its orientation relative to the advancement direction and its disposition to its co-acting tool(s) by two guiding axes in its guiding circuit, and wherein one or both guiding circuits has in at least part of said circuit has or have a first of said guided axes of a tool in a different locus to the other of said guided axes of that same tool.

Preferably each forming tool is of a kind that varies in dimensions dependent on operating temperatures.

Preferably there are incomplete circuits of tools such that dies can be removed and replaced and they exit the tool co-acting zone and prior to entering the tool co-acting zone respectively.

In another aspect the invention is a method of forming a product or product stream which comprises or includes the steps of serially presenting a material or materials to pressure of co-acting forming tools, each of said forming tools moving on a separate circuit guide, taking said material(s) in that pressurised condition as said forming tools separately advance on their respective circuit guide to at least a substantial set of said material, and separating said forming tools as they advance on their respective circuit guide to effect or allow removal of said product or product stream.

Preferably the method can involve one or more of
a molten mouldable material,
a compression set material,
a compression formable material (e.g. aluminum)
a thermoformable material presented at a thermo-formable temperature,
a thermoformable material to be heated by the forming tools to a formable condition,
a thermoformable material or molten mouldable material to be cooled by the forming tools or otherwise,
a thermoformable material to be thermoset by the forming tools,
any of the foregoing together with one or more material of a different character.

In another aspect the invention consists in a forming apparatus having a plurality of discrete forming elements ("forming tools"), as a circuit (whether complete or incomplete), a guide track or tracks for each of said forming tools at a first end thereof, as a complementary circuit, a guide track or tracks for each of said forming tools at a second end thereof, and a drive or drives to act serially on said forming tools and to urge the engaged forming tool or lead most engaged forming tool, into abutment with its predecessor thereby to advance a plurality of forming tools, wherein said circuits define an alignment zone for the forming tools in advance of a forming zone of the aligned said forming tools.

Preferably said forming zone is platform like or is of aligned contiguous forming tools.

Preferably said forming zone is under pressure.

Preferably said forming zone is thermally controlled.

Preferably there is at least one guide track for each said circuit, to act on a circuit wise spaced different roller, glide, follower of the like of each end or external surface of each said forming tool.

Preferably all of said forming tools have an identical thermal expansion behaviour and preferably said forming apparatus can move said forming tools about said circuit over a range of temperatures.

Preferably where said forming tools have a differing thermal expansion there is allowance for this, either in the case of the forming tools by a thermal expansion engagement between a carrier tool and the surface tool mounted thereto (to form a composite forming tool), or in the case of the circuit, the guide path being longer than the total length of forming tools present.

Preferably forming tools are of substantially unitary design.

In another aspect the invention is in combination, two forming apparatus as aforesaid to co-act on material(s) to be formed.

In another aspect the invention is, in operative juxtaposition forming apparatus ("first forming apparatus") as aforesaid, and at least one other forming apparatus ('second forming apparatus") as aforesaid arranged so that it, or each, moves so that the forming elements synchronise to the movement of the forming elements of the first forming apparatus over regions of their co-acting (e.g. during all or part of said forming zone).

Preferably the first forming apparatus is one embodiment defines a forming zone as a platform with which a said second forming apparatus co-acts from above.

In yet a further aspect the present invention consists in a continuous forming surface for forming of one or more infeed materials, comprising or including, a first forming tool formed or formable first surface (first forming surface) driven to move in a machine direction, a second forming tool formed or formable second surface (second forming surface) driven to move in said machine direction and lying substantially parallel and in close proximity to said first surface wherein to form a lead-in zone, followed by a said forming zone, at least one of said first or second forming surfaces is comprised of discrete forming tools mounted directly or indirectly to a guide, each said forming tool as it traverses said lead in zone moves only relative to its neighbouring block which movement is towards the other of said forming surfaces.

Preferably there are multiple lead in zones and pressure forming zones stepping down towards a final pressure forming zone on the one forming tool set.

In the foregoing aspects, preferably the discrete forming tools are "shunted" or driven (at least in part) about the circuit both in the sense (i) they push each other over at least part of the circuit under the drive action on just one (or a few) of them, and (ii) over part of the circuit orientation out of the mutual aligned condition (as in the pressure forming zone) is permitted by a differential of locus of one guides track at each of the ends of the forming tools outer surfaces.

Preferably in respect of any of the aforementioned embodiments preferably at least one circuit, and preferably both circuits, or optionally all circuits, are substantially oval when viewed.

Preferably a flat region of said oval of one or more of the circuits provides said pressure forming zone and preferably also such a flat part of the oval forms a pressure forming zone and optionally a lead in and/or lead out zone.

Preferably an inclined part from the curved part of said oval shape provides said lead zone towards said pressure forming zone.

Preferably in said alignment zone all of said discrete forming tools are moving with the same component of velocity as its neighbours not withstanding there may be movement in the orthogonal component to provide the requisite alignment.

Preferably said drive or drives is/are of one or two forming tools alone on a lower part of the/or each said oval circuit.

Alternatively each said forming tool or is individually driven.

Preferably there is engagement of adjacent forming tools at their respective interfaces (for example mechanical or magnetic).

As herein used the word drive may be via sprocket, friction, magnetic, drive servo drive, meshed drive or similar known in the art for urging a member or series of members.

Preferably said drive is in a direction where there can be a gravity dropping of said forming elements to the drive, the drive preferably being on a flat of the oval.

In yet another aspect the present invention consists in a method of forming a material comprising or including, providing a forming apparatus with a lead in zone, pressure forming zone and lead out zone, pressure forming apparatus having an upper forming surface and a lower forming surface to define there between a forming cavity, supplying to a forming apparatus at least one infeed material applying pressure to said at least one infeed material at least in said pressure forming zone, wherein at least said upper forming surface is comprised of discrete forming tools following a locus of movement, to thus impart a form into or onto said at least one infeed material.

As used herein with the term "flat" in respect of oval is irrespective of the orientation of the circuit.

Preferably each said forming tool set forms at least in part of said pressure forming zone a forming surface.

Preferably each of said forming surfaces co-act to form said material(s).

Preferably said material is formed into a roofing material or substrate.

Preferably said material to form said roofing tile or substrate is a ultraviolet stabilised thermoplastic polyurethane.

Preferably said opposing surfaces apply pressure from 1.0 kg/cm2 to 3 kg/cm2 to said material to form said roofing material or substrate.

Preferably said pressure range is between 1.8 kg/cm2 to 2 kg/cm2 in said pressure forming region.

Preferably said opposing surfaces can move from 0.0 m/min to 300 m/min said machine direction.

Preferably said opposing surfaces move between 25 m/min to 36 m/min in said machine direction to form said roofing material or substrate.

Preferably said product is a roof flashing.

Preferably said material is extruded onto an adhesive and expanded mesh lay-up for subsequent forming in said pressure forming zone.

Preferably said material is formed into a liquid crystal display substrate.

Preferably said material to form said display substrate is a chosen from any one or more of the following:

polycarbonate (PC), polymethyl methacrylate (PMMA), or general purpose polystyrene (GPPS).

Preferably said opposing surfaces apply pressure from 1.0 kg/cm2 to 3 kg/cm2 to said material to form said display substrate.

Preferably said pressure range is between 1.8 kg/cm2 to 2 kg/cm2 in said pressure forming region.

Preferably said opposing surfaces can move from 0.0 m/min to 20 m/min said machine direction.

Preferably said opposing surfaces move between 14 m/min to 15 m/min in said machine direction to form said display substrate.

Preferably said material is imprinted with grooves of elliptical cross section of 100 micrometers deep by 200 micrometers wide running along a planar surface of said material.

Preferably said material is imprinted with depression of elliptical plan form of 100 micrometers deep by 200 micrometers wide.

Preferably said imprinting is on both sides of said material to form said display substrate.

Preferably said material is formed into a container.

Preferably said material to form said container or substrate is a thermo-formable material.

Preferably said material is vacuum formed in said pressure forming zone to form said container.

Preferably said formed container is filled with a second material (e.g. food, or liquid or similar).

Preferably a sealing member to said filled container is then applied to seal said filled container.

Preferably said forming, filling and sealing is carried out in said pressure forming zone.

Preferably said material is formed into a photovoltaic cell.

Preferably said photo voltaic cell is formed by the following steps:

forming a cell base locating a conductive layer or layers in said cell base locating the photo voltaic elements on said conductive layer(s)

forming and locating a cover to at least in part seal the resultant assembly.

Preferably said photovoltaic elements are chosen from any one of more of a silicon, thin film or die sensitised material.

Preferably said cover seals said assembly.

Preferably said cell base is selected from any one or more of a polymer (whether crystalline or otherwise), steel or glass.

Preferably said forming occurs on a common lower forming tool set.

Preferably said forming occurs on two separate upper forming tools sets, interrupted by the location of said conductive layers and photovoltaic elements.

Preferably said opposing surfaces can move from 0.1 m/min to 27 m/min in said machine direction.

Preferably said pressure range is between 20 kg/cm2 to 25 kg/cm2 in the first of said upper forming tool sets and between 0.1 kg/cm2 to 5 kg/cm2 in the second of said upper forming tool sets.

Preferably said material is formed into an optical media (e.g. a DVD or CD), either pre-recorded or blank.

Preferably said material to form said optical media is any one of more of a ultraviolet stabilised thermoplastic polyurethane, poly carbonate, polymethyl methacrylate, or general purpose polystyrene.

Preferably said opposing surfaces apply pressure from 1.0 kg/cm2 to 3 kg/cm2 to said material to form optical media A method as claimed in claim 120 wherein said pressure range is between 1.8 kg/cm2 to 2 kg/cm2 in said pressure forming region.

Preferably said opposing surfaces can move from 0.0 m/min to 100 m/min said machine direction.

Preferably said opposing surfaces move between 3 m/min to 7 m/min in said machine direction to form said optical media.

Preferably said opposing surfaces move at 5 m/min said machine direction to form said optical media.

Preferably there are multiple cavities across said forming tools.

Preferably the data for a pre-recorded optical media is stamped in said pressure forming zone.

Preferably the centre aperture of said optical media is punched in said pressure forming zone.

Preferably the outer diameter of said optical media is punched out in said pressure forming zone.

Preferably a product formed by a method as herein described with reference to any one or more of the accompanying drawings.

Preferably a forming apparatus as herein described with reference to any one or more of the accompanying drawings.

Preferably a method of forming a material as herein described with reference to any one or more of the accompanying drawings.

Preferably a product by a method or methods as herein described with reference to any one or more of the accompanying drawings.

Preferably a roofing tile, material or substrate as herein described with reference to any one or more of the accompanying drawings.

Preferably a roofing tile, material or substrate as herein described with reference to any one or more of the accompanying drawings.

Preferably a liquid crystal display substrate as herein described with reference to any one or more of the accompanying drawings.

Preferably a liquid crystal display substrate as herein described with reference to any one or more of the accompanying drawings.

Preferably a container as herein described with reference to any one or more of the accompanying drawings.

Preferably a container as herein described with reference to any one or more of the accompanying drawings.

Preferably a photovoltaic cell as herein described with reference to any one or more of the accompanying drawings.

Preferably a photovoltaic cell as herein described with reference to any one or more of the accompanying drawings.

Preferably an optical media as herein described with reference to any one or more of the accompanying drawings.

Preferably an optical media as herein described with reference to any one or more of the accompanying drawings.

In a further aspect the present invention consist in a product as herein described with reference to anyone or more of the accompanying drawings.

In a yet a further aspect the present invention consists in a method of forming as herein described with reference to anyone or more of the accompanying drawings.

In another aspect the present invention consists in a forming apparatus as herein described with reference to any one or more of the accompanying drawings.

In yet a further aspect still the present invention consists in a product by a method or methods as herein described with reference to any one or more of the accompanying drawings.

In any of the aforementioned embodiments preferably the circuits are such as to provide for gaps between dies or forming tools after passage through the forming zone or pressure zone and prior to uptake by the drive.

The term, bolster, block, or die as used herein can be used interchangeably, unless explained otherwise, and is taken to mean a tool that moves along the circuit, guided directly or indirectly by the guiding tracks, whether the forming surface is dependent therefrom, e.g. by fastening thereto, or is an integral part thereof and includes also bolsters, blocks or dies of a multi-part construction.

The term 'comprising' as used in this specification means 'consisting at least in part of', that is to say when interpreting statements in this specification which include that term, the features, prefaced by that term in each statement, all need to be present but other features can also be present.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The term used generically hereafter to define an individual forming tool, whether it is of singular or of a composite (two or more piece) construction (e.g. a bolster to run in the said guide to which is connected a forming surface tool) is the term "block". Similarly a "block set" is generically equivalent to a "die set".

Whilst right hand and left hand have been mentioned, this can be interchangeable unless specifically stated otherwise. Also whilst the apparatus and method has been shown to move from left to right, this is convention only and equally the apparatus and method could move from right to left and have been used to describe orientations merely as shown on the pages of the drawings.

Whilst herein the terms horizontal and vertical have been used or depicted in the drawings, it is to be understood, that unless specified as necessary, the orientations of the apparatus and machinery can be at any angle, for example, but not limited to vertical, or at any angle to the horizontal or vertical, or may vary over a range or angles.

BRIEF DESCRIPTION OF THE DRAWINGS

With reference to the accompanying drawings preferred embodiments of the present invention are now described, whereby;

With reference to the accompanying drawings preferred embodiments of the present invention are now described, whereby;

FIG. 3c shows a multiple lead-in zones with multiple pressure forming zones prior to the main pressure forming zone, FIG. 5b is a general sigmoid curve, and FIG. 5c is a generic curve indicating that any form can be followed with the forming tools together with forward and backward runners at differing heights on the forming tool, FIGS. 6a-6d show in side elevation a typical guide track which the forming tools can run in, FIG. 6a showing a left hand top track frame with guide track in inside elevation, FIG. 6b showing side elevation, FIG. 6c showing inside elevation of a right hand top track frame, Sections AA and BB on corresponding lines AA and BB, and FIG. 6d showing an inside isometric view of the guide track frame, FIG. 7 shows left and right track frames with guide track of the upper circuit showing the forming tool alignment region, lead in region to the pressure forming zone, and lead out region, FIGS. 13a-13d show similar views to that of FIGS. 6a-6d with the exception that these are for the tracks frames and guide track for the lower circuit, FIG. 15a shows a perspective view of FIG. 15b, FIG. 15b shows a side elevation of a block with a hardened wear plate on the side and chamfered bolster and die, and FIG. 15c shows a further side elevation of a block with a hardened wear plate on the side and chamfered bolster and die and expansion interface, FIGS. 16a-16d show at FIG. 16a a split end view of a forming tool having the back runner spaced wider than that of the front runner, at FIG. 16b a side view of a forming tool with forward and back runners aligned, at FIG. 16c the front runner higher than the back runner, and at FIG. 16d the front runner lower than that of the back runner, FIGS. 18a-18e show various views of the wear plates, at FIG. 18a is a first side elevation of a wear plate, at FIG. 18b is a cross-section through the centerline of the wear plate of FIG. 18a, at FIG. 18c is a second side elevation of the wear plate of FIG. 18a, at FIG. 18d is a wear plate shown with followers in situ, at FIG. 18e is an end cross-section view of a wear plate, FIG. 19b shows a cross section through the key zone of the carrier tool and surface tool showing the keying and allowance for expansion in the parallel and perpendicular directions, FIG. 19c shows a side view of the carrier and surface tools, FIGS. 21a-j show in schematic view the end form of the present invention at FIG. 21a a singular upper and lower die set of unequal length, at FIG. 21b a singular upper and lower die set of equal length, at FIG. 21c multiple-upper die sets and singular lower die set at FIG. 21d multiple forming apparatus with second and tertiary processes there between, at FIG. 21e multiple upper die sets with processing in between, at FIG. 21f a reversed form whereby there is a continuous upper die set and multiple lower die sets, FIG. 21g shows a stack of three forming tools sets, FIG. 21h shows a further embodiment whereby a set of forming tools is at least partially wrapped round a circular forming surface (e.g. a drum), the forming tools producing an opposing surface to interact with the surface of the drum, the forming tool set having at least a lead in zone, and optionally a lead out zone as earlier described, FIG. 21i shows a further embodiment of the apparatus where the upper and lower forming tools sets form substantially horizontal circuits that are substantially flat, FIG. 21j shows a further embodiment whereby the upper forming tool set is as per earlier description, and the lower forming tool set is a substantially flat conveyance or track of forming tools, FIG. 24d shows a close up side view of co-acting forming tools being sandwiched between top and bottom pressure plates, and how the followers of the forming tools sit clear of the guide tracks, FIG. 26a shows co-acting dies are locked together, FIG. 26b shows co-acting dies are locked together with a Morse taper, and FIG. 26c shows successive dies are locked together with a Morse taper, FIG. 27b shows a roofing substrate as a flashing with a sinusoidal or fluted edge made by a method or apparatus of the present invention, FIG. 27c shows in side view the lay up of at least the fluted portion of the roofing substrate, FIG. 27d shows one side of a textured substrate, such as may be used in an LCD display substrate, FIG. 27e shows a further texturing of a substrate such as what might be used in a further LCD display substrate, FIG. 27f shows in side view close up the pressure forming zone as it may be adapted to form a container, fill the container and seal the container.

Figure 1:
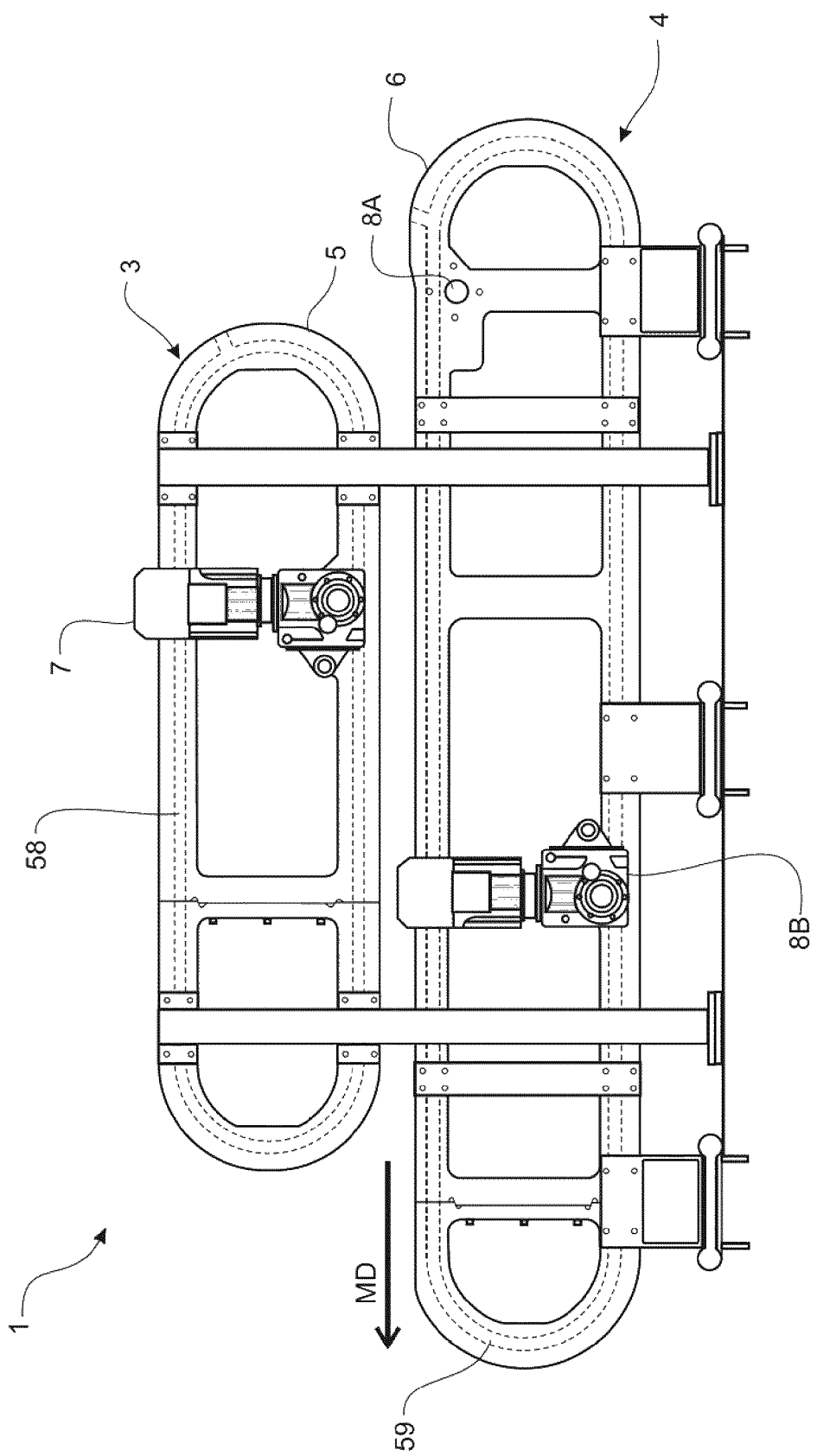
FIG. 1 shows in side elevation a forming apparatus of the present invention including an upper circuit of forming tools and a lower circuit of forming tools defining there between a forming surface, surfaces or cavity.

As used herein the term "(s)" following a noun includes, as might be appropriate, the singular or plural forms of that noun.

Preferred embodiments of the present invention will now be described with reference to the Figures.

We recognise an advantage in providing forming apparatus (1) of a kind that moves two sets of tooling parts (forming tools (11)) in procession continuously or continually when in use (regardless of continuous or stop start motion, hereinafter referred to as a "continuous" process) to bring a forming tool (11) into a co-acting condition with a complementary forming tool (11) to then pressurise or hold the co-acting forming tools against pressure to the tolerances required for the material or materials to be formed, and then to separate the forming tools. Such a process may be at a controlled temperature also.

The forming apparatus (1) generally consists of a first forming tool set (or upper die set) (3) carrying, defining and/or forming an upper forming surface (23), and a second forming tool set (or lower die set) (4). The lower die set (4) may run in a second forming tool set guide or guides (6) and lies in close adjustable proximity to the first die set (3). The lower die set (4) may carry, define and/or form a lower forming surface (24).

Formed there between is a continuous forming region defined by the opposing surfaces of the upper forming surface (23) and the lower forming surface (24). The forming surfaces (23 and 24) move in a machine direction MD as indicated. In the preferred embodiment the upper die set has a first transverse axis (13). The lower die set has a second transverse axis (14). Whilst the upper and lower are used these are understood to be relative terms only and the machine direction may be horizontal as indicated or vertical and the transverse axes whilst shown as being horizontal (and parallel) may be at any angle about the machine direction (whether the machine direction is vertical, horizontal or at any other angle). Optionally the first transverse axis (13) may be at 90 degrees to the second transverse axis (14). For example the first transverse axis may be horizontal and the second transverse axis (14) may be vertically oriented.

The basic operating principle of the present invention is the presence of the two cooperative circuits of forming tool sets, the first forming tool set (3) and the second forming tool set (4). The forming tools (11) are guided at least in part by and preferably run either directly in a first and second forming tool set guides (5 and 6 respectively). In one preferred embodiment the forming tool (11) is largely unitary. In another preferred embodiment the forming tool (11) is a composite of a carrier tool (25) and a surface tool (28).

The two components of the forming tool may be attached in any convenient way that allows for thermal expansion where necessary. This is discussed further on.

The carrier tool (25) runs in its respective guide track (5 and 6) and the surface tool (28) co-acts with the opposing forming tools at least in the pressure forming zone to form the material therebetween.

Figure 2A:
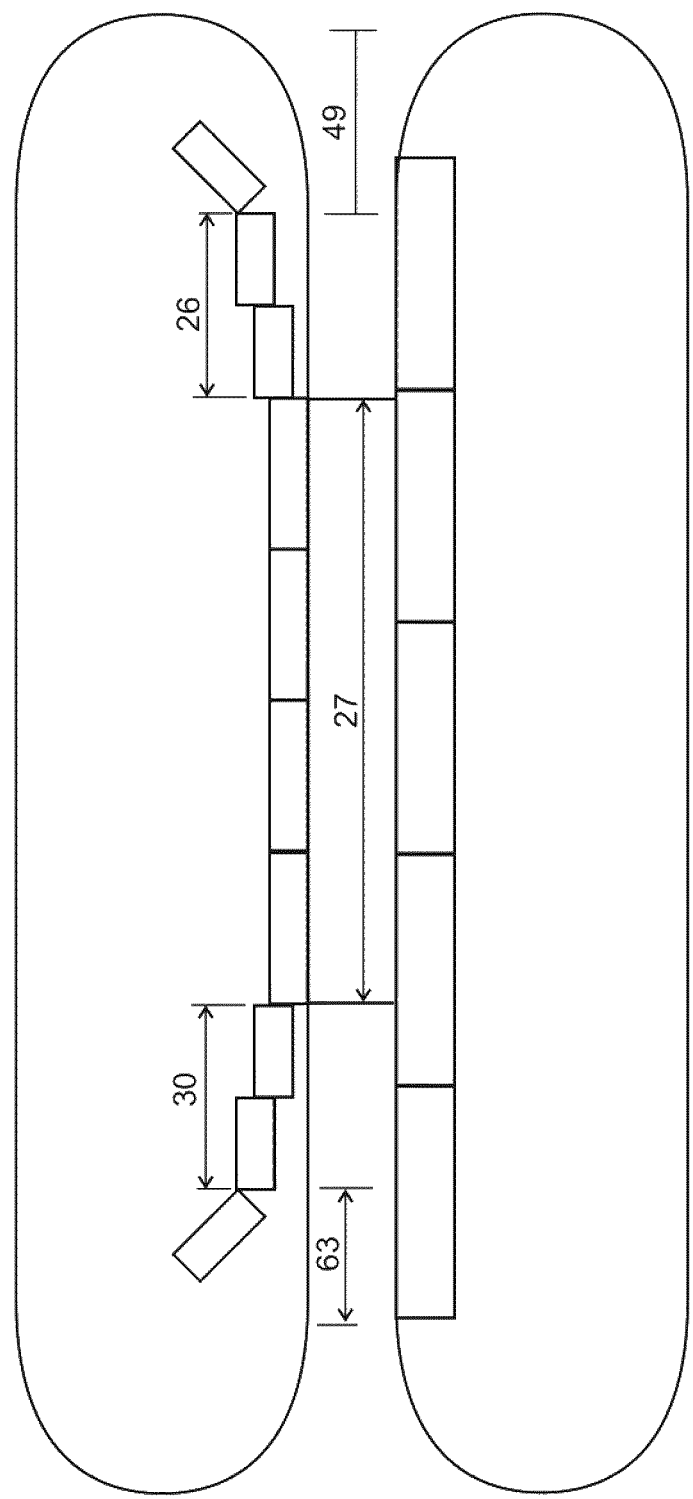
FIG. 2A shows a schematic of the continuous forming system of FIG. 1 showing the movement in particular of the upper circuit and forming tools therein, together with the forming tool alignment zone, lead in zone, pressure forming zone and lead out zone.
Figure 2B:
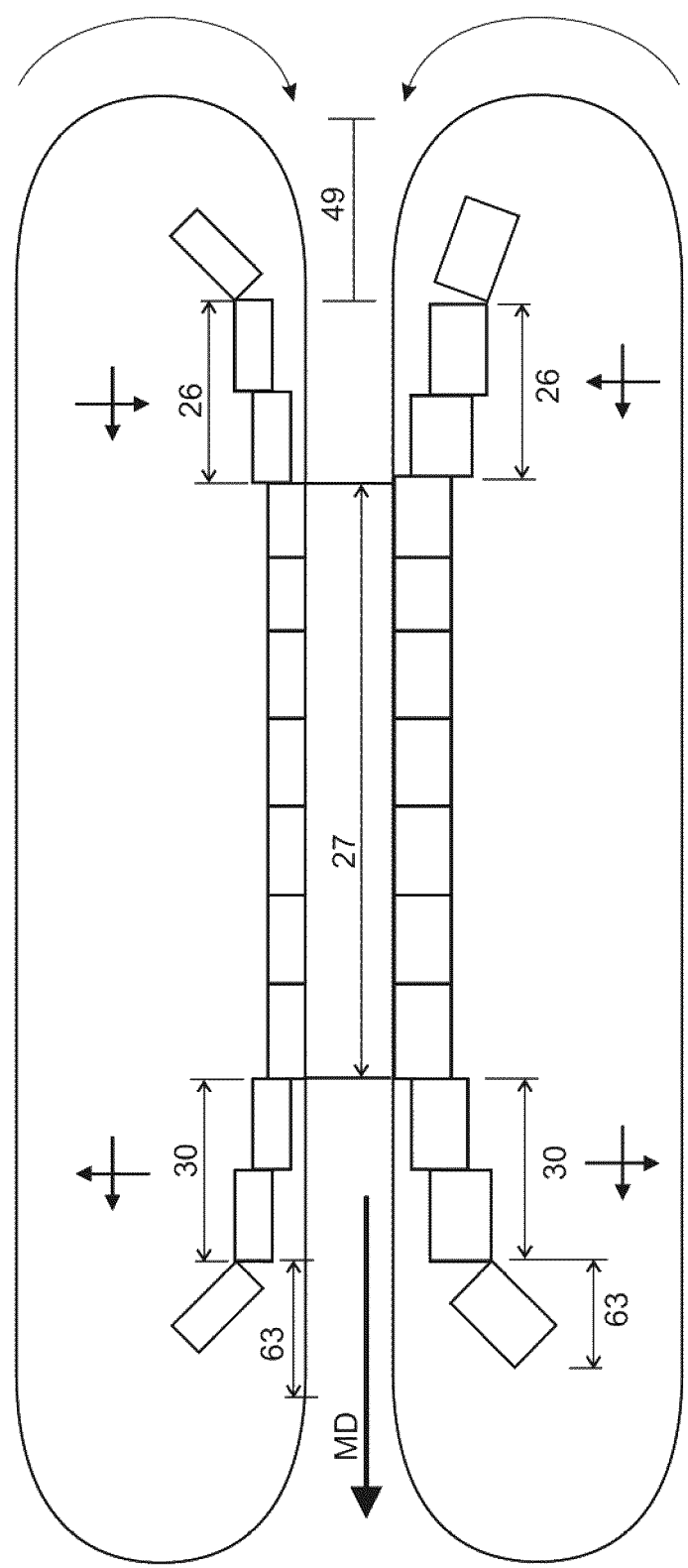
FIG. 2B shows a similar schematic but with lead in and lead out zones at both ends of the apparatus and on both circuits.
Figure 3A:
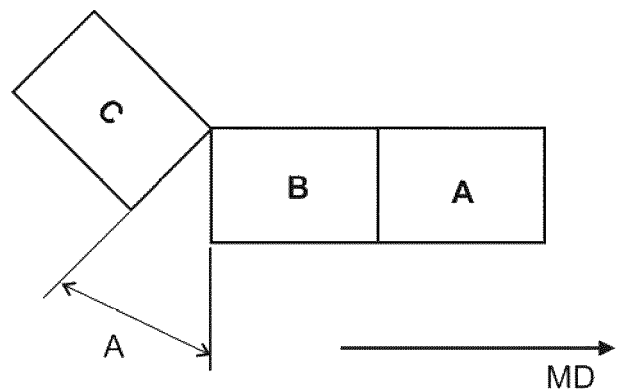
FIGS. 3a-3c show close-up views of the movement including at FIG. 3a a prior art arrangement whereby dies, or bolsters, or tools rotate round and create a nip point A, whereas in FIG. 3b the movement of the forming tool set is shown to rotate into place, at the forming tool alignment zone (block E), and thereafter the lead in zone (blocks D, C, B) to move vertically down perpendicular to the machine direction thus at the crucial point where the dies meet the material to be formed there is no gap between adjacent die or tools, to then carry on into the pressure forming zone, the group of forming tools moving also in the machine direction.
Figure 3B:
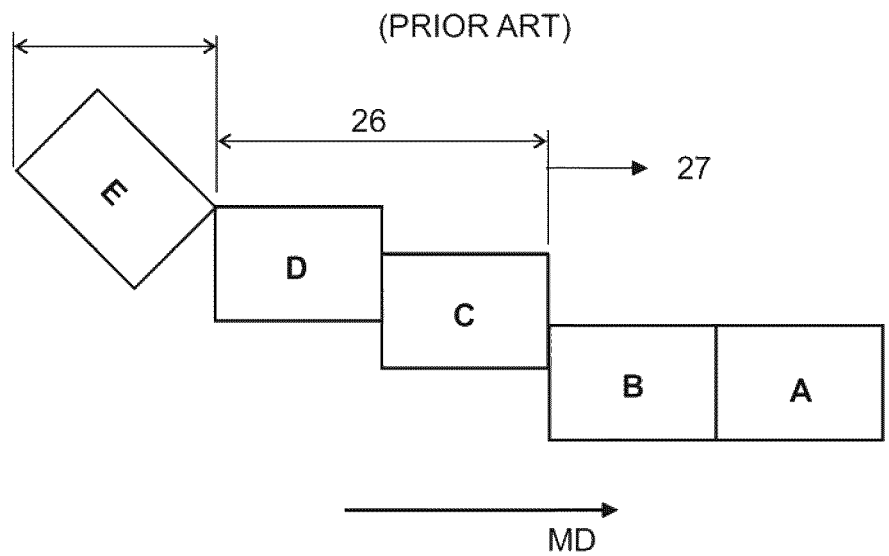

There may be only one guide or more than two guides depending on the application requirements. At least one of the forming tool sets) is shown as the upper or first forming tool set (3) runs in a lead in zone (26) prior to a pressure forming zone (27). The location of each of these zones is shown in FIGS. 2A and 2B and in close-up in FIGS. 3a-3c.

Figure 3C:
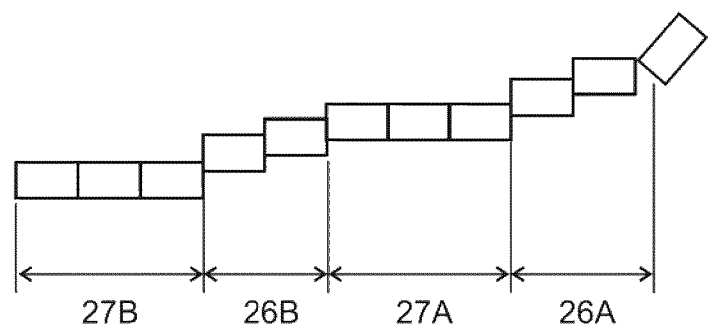

In preferred embodiment there are multiple lead in zones and pressure forming zones stepping down towards a final pressure forming zone on the one forming tool set. This is shown in FIG. 3c where there is a first lead in zone 26A, a first pressure forming zone 27A and then a subsequent lead-in zone 26B and then a subsequent pressure forming zone 27B. There may well be more also as required. The same may occur for the lead out zone. Also there may be only one such set of multiple lead in pressure forming zones on an apparatus or multiple such ones.

The present invention utilizes a lead in zone (26) whereby after forming tools (11)) have become parallel to each other (e.g. forming tools D and C) they then move at an inclined path towards the other opposing surface (also formed of forming tools of the other forming tool set). As they also translate in the machine direction MD the only relative movement between adjacent forming tools D and C in the lead in zone (26) is a parallel motion toward the opposing forming surface. In this way there is no aperture available (in the same way as a nip point A, of the prior art—FIG. 3a).

Figure 4:
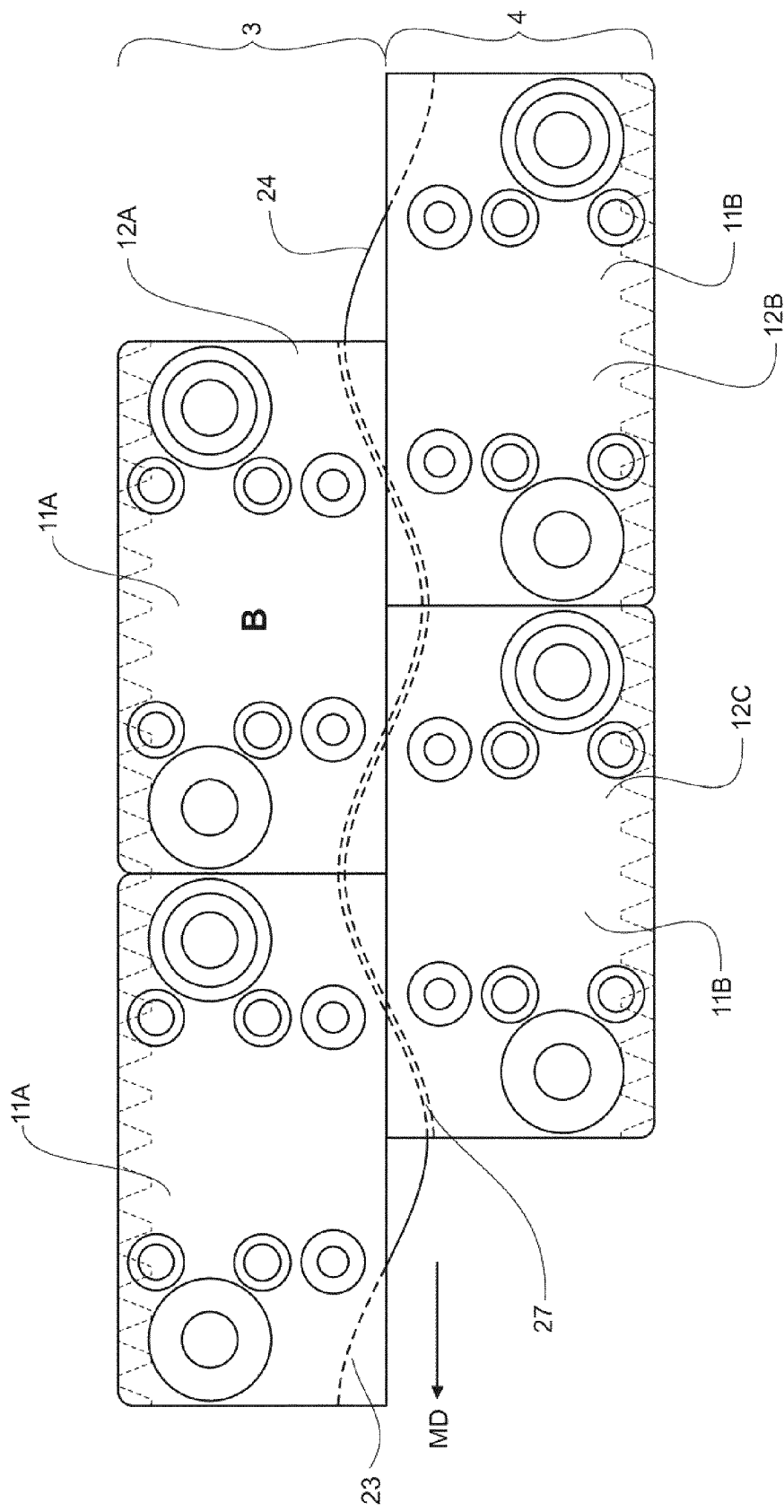
FIG. 4 shows a close-up of co-acting upper and lower dies of the forming tools, together with the pressure forming cavity there between and shows the discrete form of the tools.
Figure 5A:
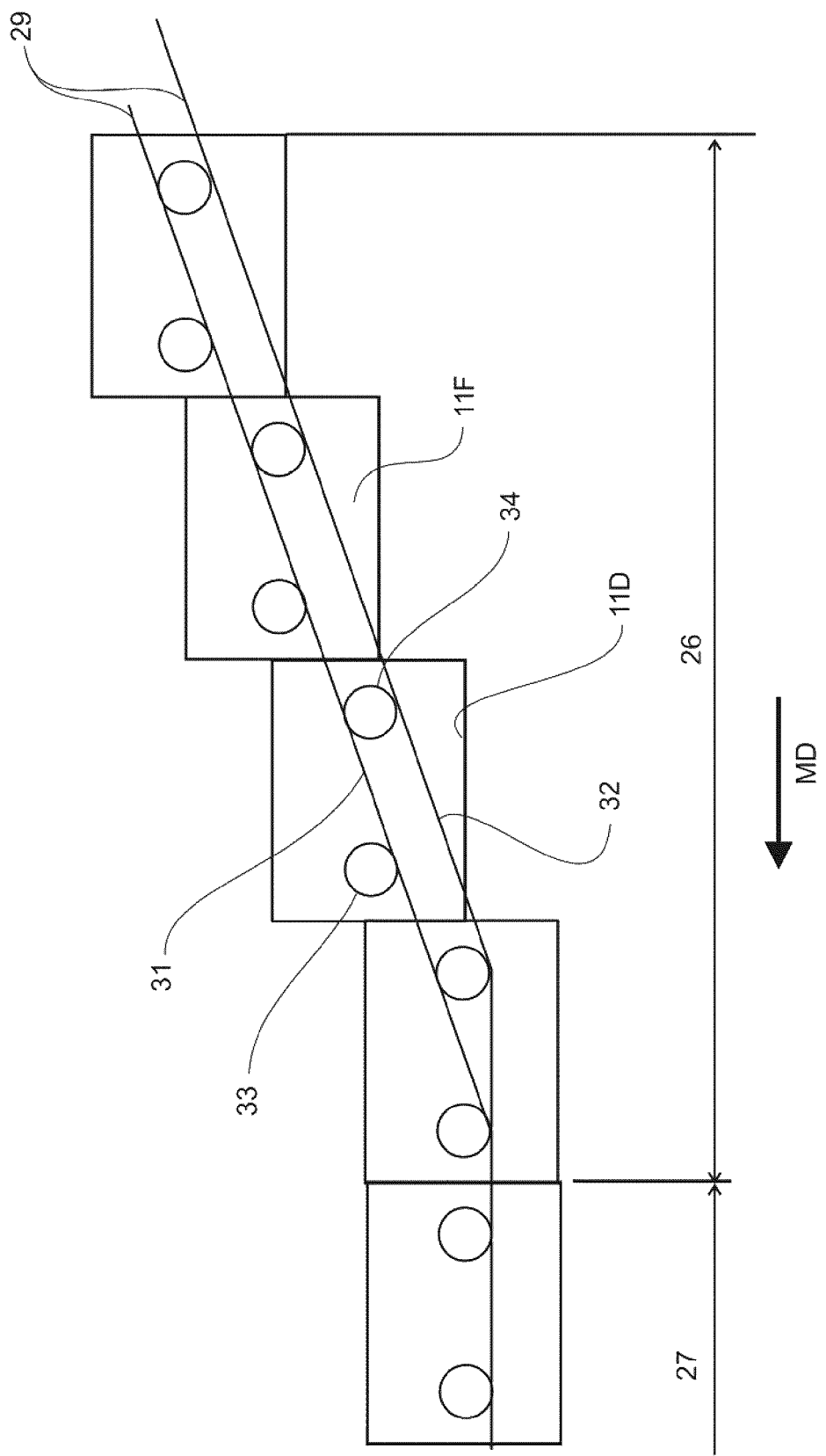
FIGS. 5a-5c show a set of close up schematic views of the lead in (and in reversed machine direction form the lead out) zones showing the movement of forming tool (whether of bolster and/or individual dies) on an upper and lower track, including at FIG. 5a is an incline toward the other forming surface.
Figure 5B:
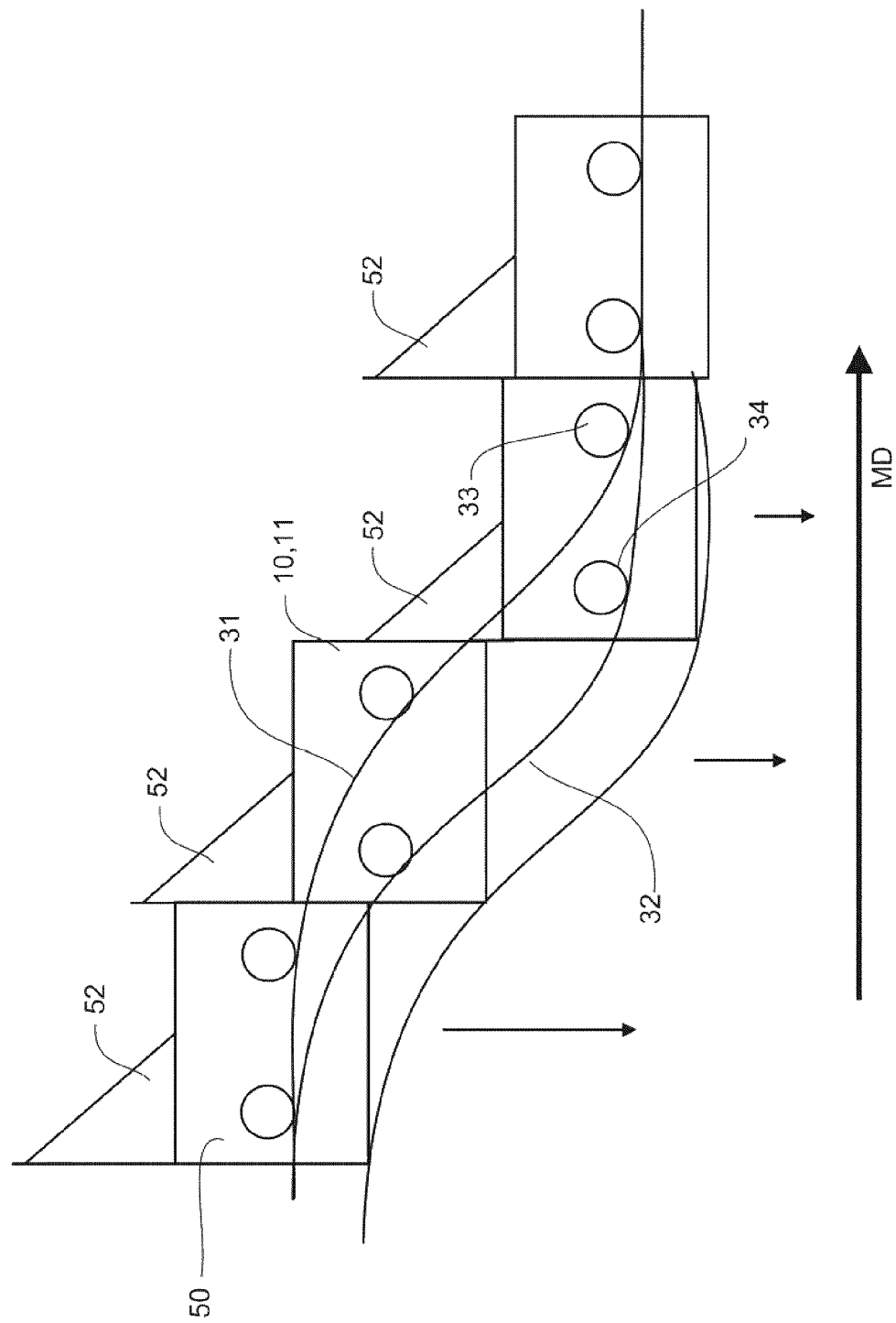
Figure 5C:
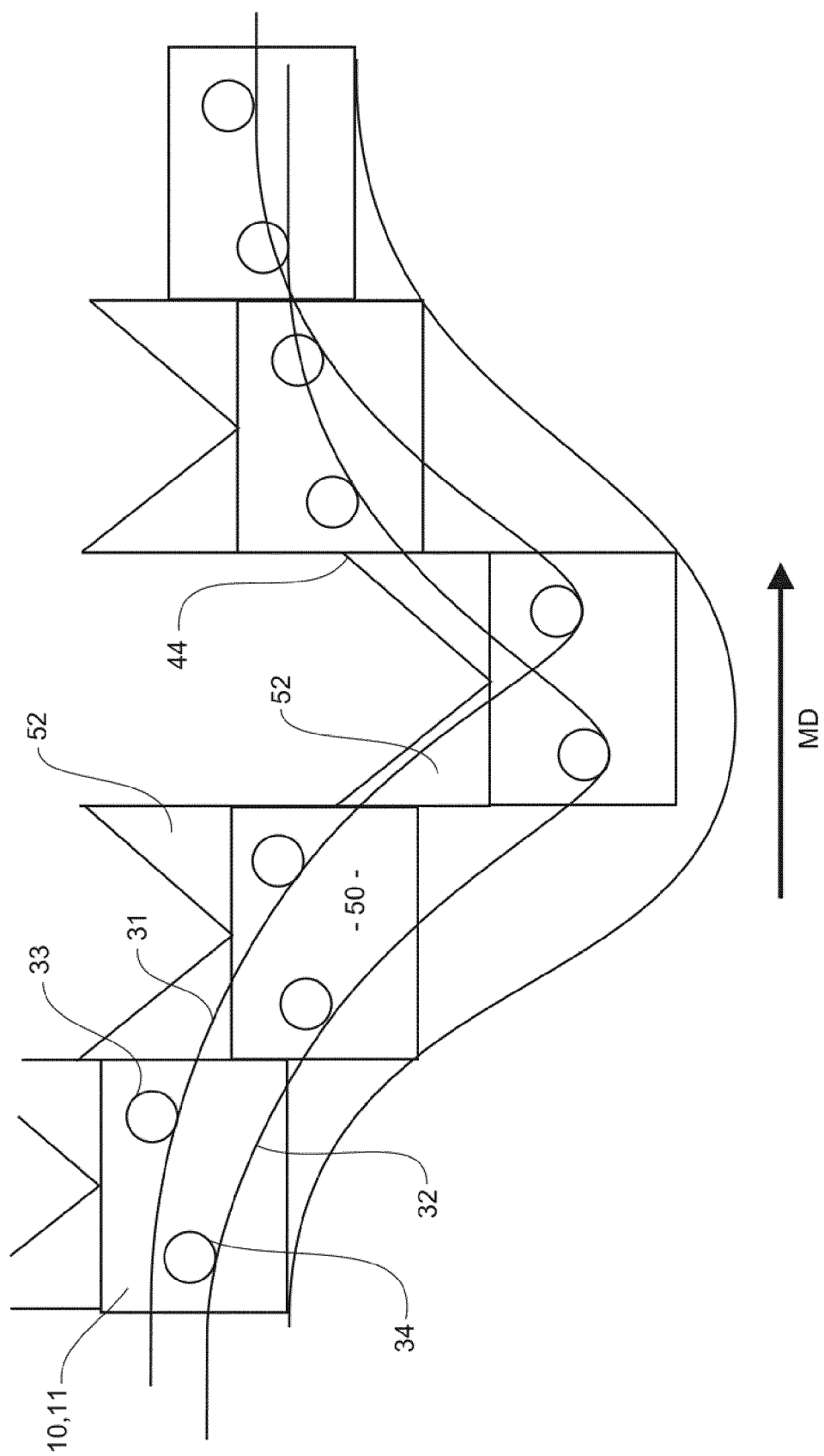
Figure 8:
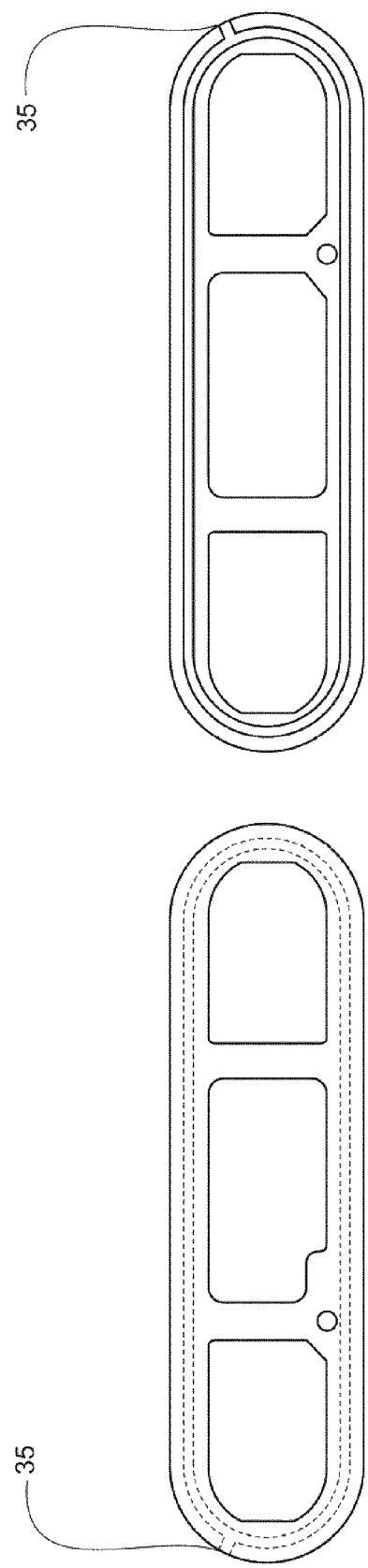
FIG. 8 shows inside views of the left and right track frames of the upper circuit again showing the forming tool take out points.

In doing so any mould line that may be imparted into a finished product is minimal and there is no cavity or aperture (nip point) for residual product to bunch or form in. As a consequence a continuous forming surface is presented in the pressure forming zone (27). An example of the resultant pressure forming zone (27) is shown in FIG. 4 clearly there can be seen the individual forming tools (HA) of the first forming tool set (3) that may run in the first forming tool set guides (5). Similarly lower forming tools (11B) run in second forming tool set guides (6).

The lower forming tools (11B) intern form the lower forming surface (24). As shown in this particular embodiment in FIG. 4 the lower forming tools are out of register by 180° (or by half a forming tool), though the synchrony of the forming tools will depend upon the application. Together the upper co-acting tool 12A forms a set of co-acting tools with lower co-acting tools 12B and 12C.

In the embodiment shown in FIGS. 3a-3c, 4, 5a-5c, and 6a-6d the upper or first forming tool set (3) runs in a first forming tool set guide (5). The first forming tool set guide (5) consists of a guide preferably either side of the first forming tool set (3) (this guide however may bear on any outer surface of the forming tool).

On the inner facing surfaces of each of the guides (5) there is shown a guide track (29). The guide track (29) around that area outside of the lead in zone (26), (and in this embodiment lead out zone (30)) is substantially a single track for the forming tools. There is no required relative movement of the forming tools to each other out side of the lead in and lead out zones, other than the egress away from the pressure forming (and lead out) zones to be recycled at the lead in zone again. It is to be appreciated that in one embodiment the forming tools are captive to the guide they are not captive to each other, or the tool with which they co-act. They are free to move along the guide track (29) except under the influence of a drive means. (This will be explained in further detail later). In the preferred embodiment there is as shown the lead in zone (26), pressure forming zone (27) and in addition in this embodiment a lead out zone (30). The lead out zone (30) is to be understood to be the reverse of the lead in zone in that forming tools move in an inclined path away from the opposing forming surface and the only relative movement between adjacent forming tools in this zone is a movement perpendicular to the machine direction and away from the opposing forming surface(s).

Figure 9:
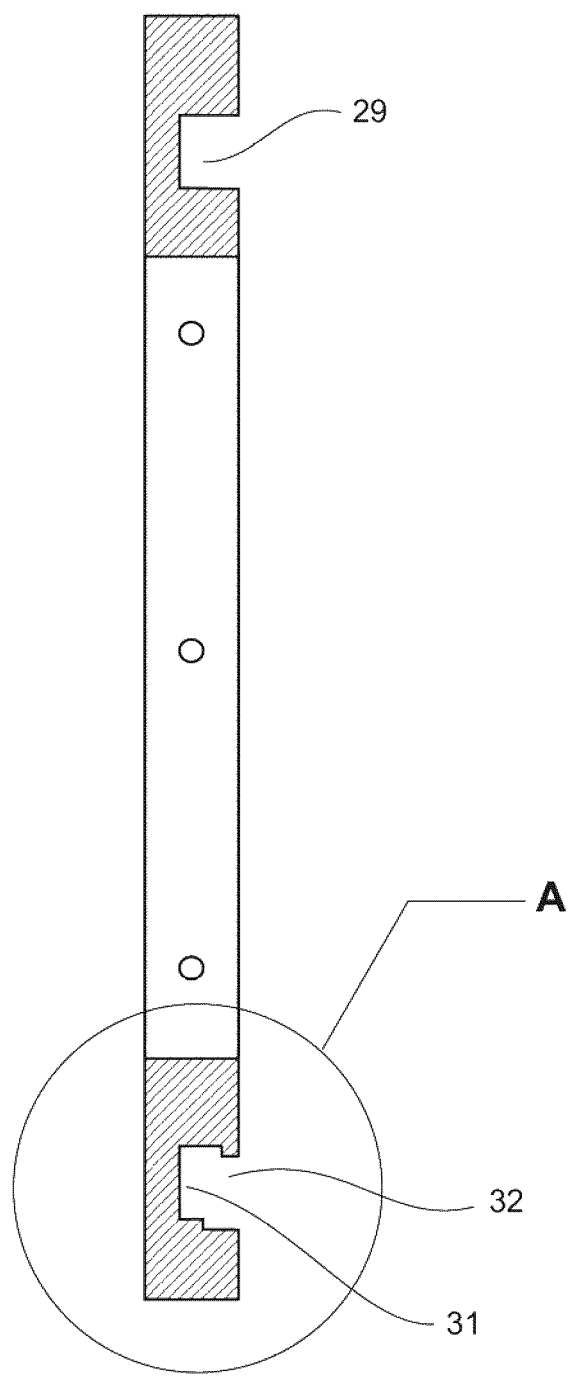
FIG. 9 shows a close-up of the left hand track frame along line BB from FIG. 6c.
Figure 10:
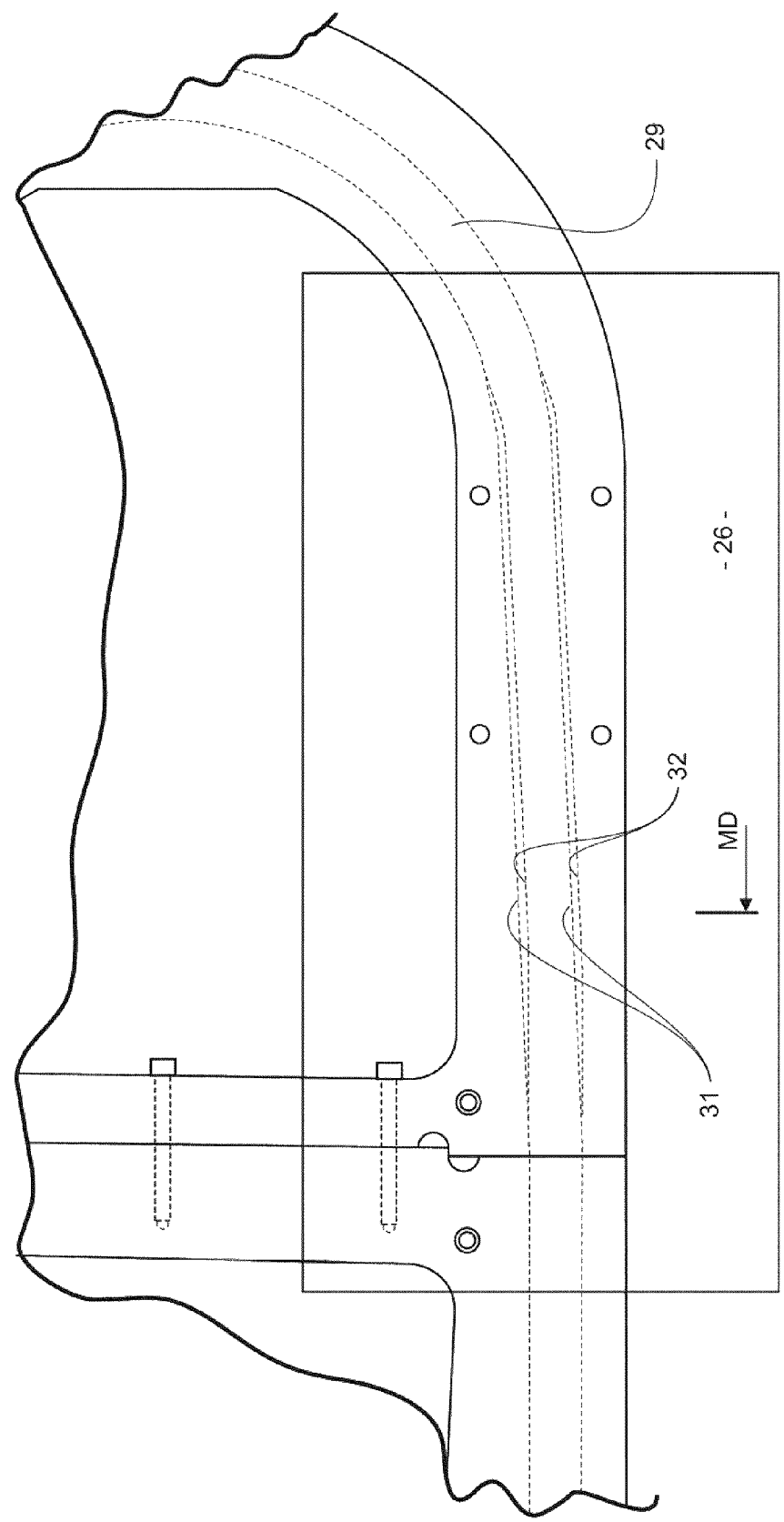
FIG. 10 shows a close-up of the inside view of the right hand track frame of an upper circuit, showing in detail the forming tool alignment zone and change in height of the lead in zone with respect to the machine direction.

Hereafter the description of the lead in zone will be described (it will be understood that unless otherwise specified the lead out zone is the reverse operation). A cross section of the guide track (29) is shown at FIG. 9 and in close up in FIG. 11. As can be seen there is a relatively upper guide track (31) where a forward runner (33) of the forming tool (11) lies, and a relatively lower guide track (32) for a rearward runner (34). At the beginning of the lead in zone (26) the guide track (29) diverges into the upper guide track (31) and lower guide track (32) for the forward runner (33) and backward runner (34) respectively of the forming tool (11). This has the effect of allowing the individual forming tools to move downward or toward the opposing forming surface (i.e. co-acting forming tools) whilst not creating any nip points or gaps between adjacent forming tools (11D and 11F). Indeed the only relative movement of one forming tool compared to its adjacent forming in the lead in zone (or lead out zone) is a movement toward the opposing forming surface (in the particular embodiment shown this is a downwards movement of the upper forming tool). The net effect of the individual forming tools flowing around the guides to the lead in point of the lead in zone (26) shows that a nip point is formed prior to the lead in zone (26) and thereafter the forming tools whilst moving in a machine direction move relative to one another only toward the forming surface and thereafter are in the pressure forming zone (27). Thus where the material to be formed may encounter the forming tools (i.e. in the lead in zone) there is no nip point to capture material.

For maintenance purposes and/or changing of forming tool profiles or similar there is a takeout point (35) on both upper and lower guides this allows access to the guide track (29) so that individual forming tools or the entire set can be removed, maintained, or changed or added to. For the upper guide in some lower pressure or feed rate applications the upper area of the upper guide can allow removal and reinsertion of forming tools.

In addition the guide as shown may be of two pieces being a first guide piece (36) and a second guide piece (37) these are preferably joined via fasteners as shown in FIGS. 6a-6d. The two piece nature of the guide track allows for its length to be added or subtracted to by adding joining sections in between which continue the guide track (29) between the first guide piece (36) and second guide piece (37).

The lower forming surface (24) can be formed simply by forming tools on a conveyor style chain or conveyance system that come around and form a conveying surface. Such a system will met the aims of the present invention and be covered by it if it should take tools from one end of the circuit to the other. Provided no material to be formed is applied to these forming tools prior to them forming a continuous forming surface (i.e. after their nip point) then no material may enter the nip points that may be formed. In such a configuration the axis (14) of the lower die set may be at 90 degrees to the that of the upper forming set. For example the lower die set may be similar in configuration to a "luggage conveyor" and merely presents tools to con-act with the upper forming tool set that move toward the lower surface to pressurise the material to be formed.

Alternatively there may be a lead in zone as described above such that there are two inclined paths of forming tools one for an upper forming tool set and one for a lower forming tool set.

Figure 11:
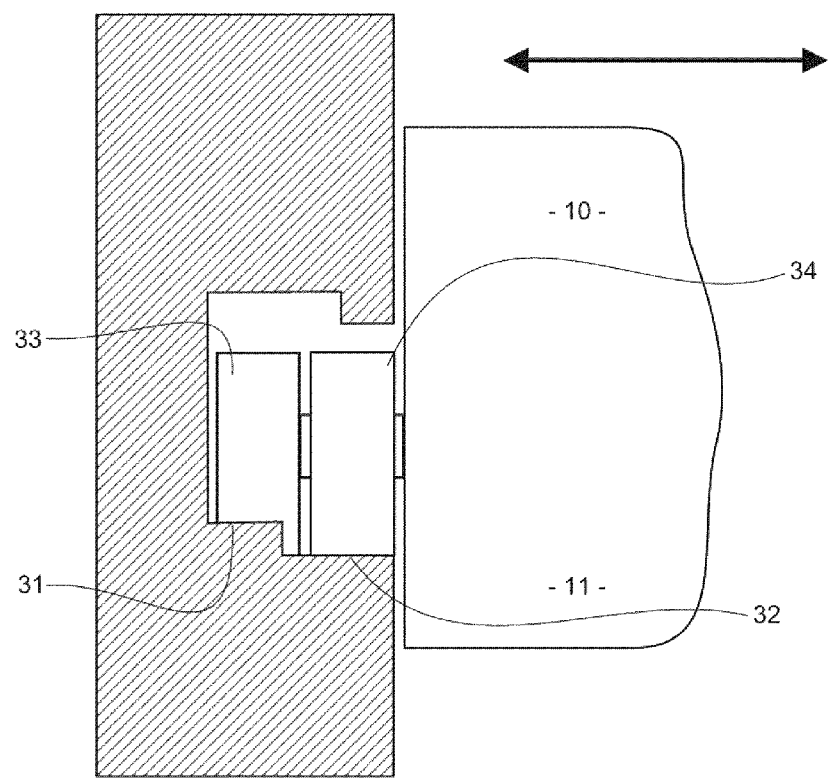
FIG. 11 shows a close-up of Detail A from FIG. 9, showing the height difference in the upper guide track for the forward runner and lower guide track for the backward runner of the forming tool.
Figure 12:
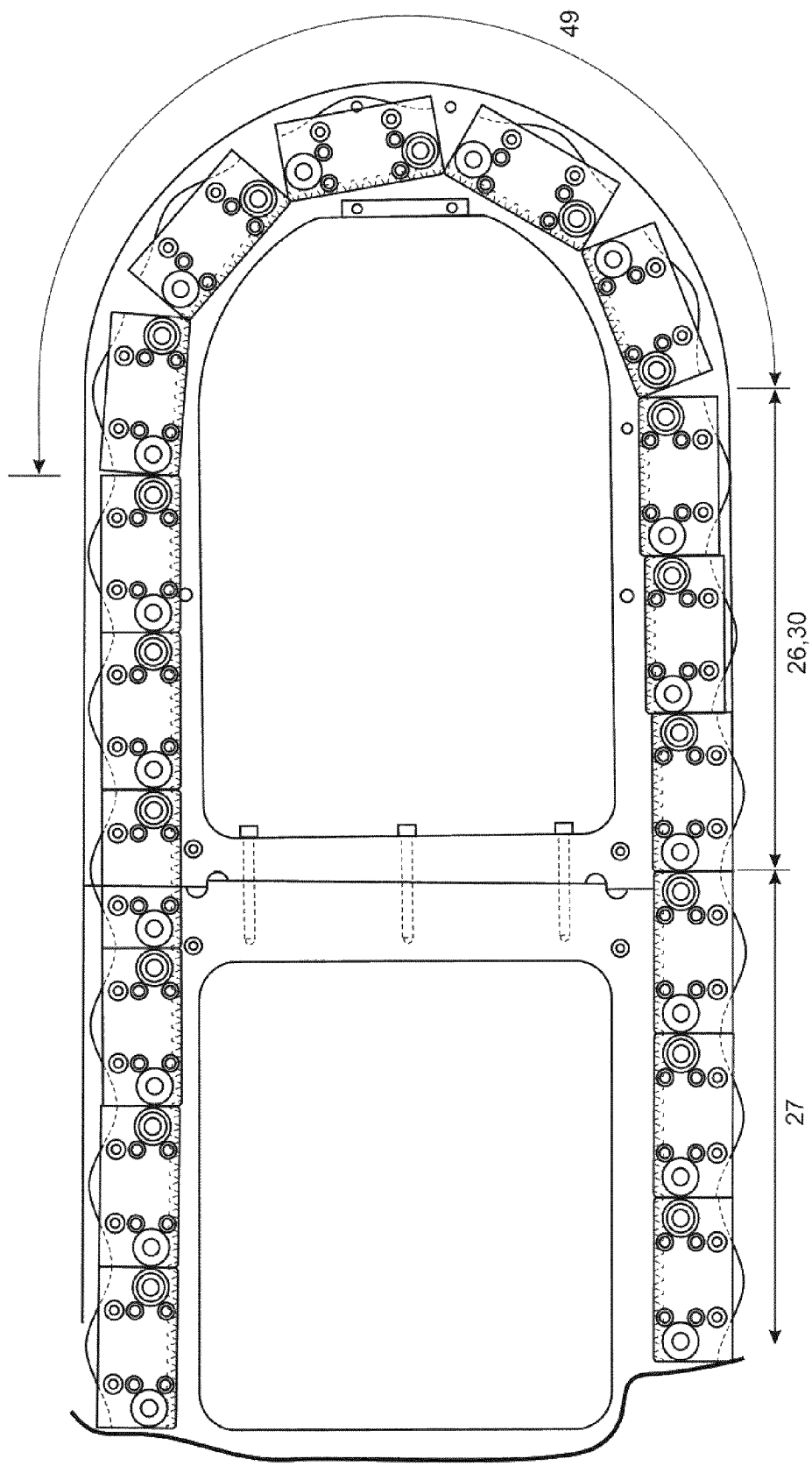
FIG. 12 shows an upper circuit with the left hand track frame removed showing the movement of a set of forming tool (including dies attached) and particularly the movement of the forming tool as they enter the alignment zone, downward movement in the lead in zone and then movement in the pressure forming zone.
Figure 14:
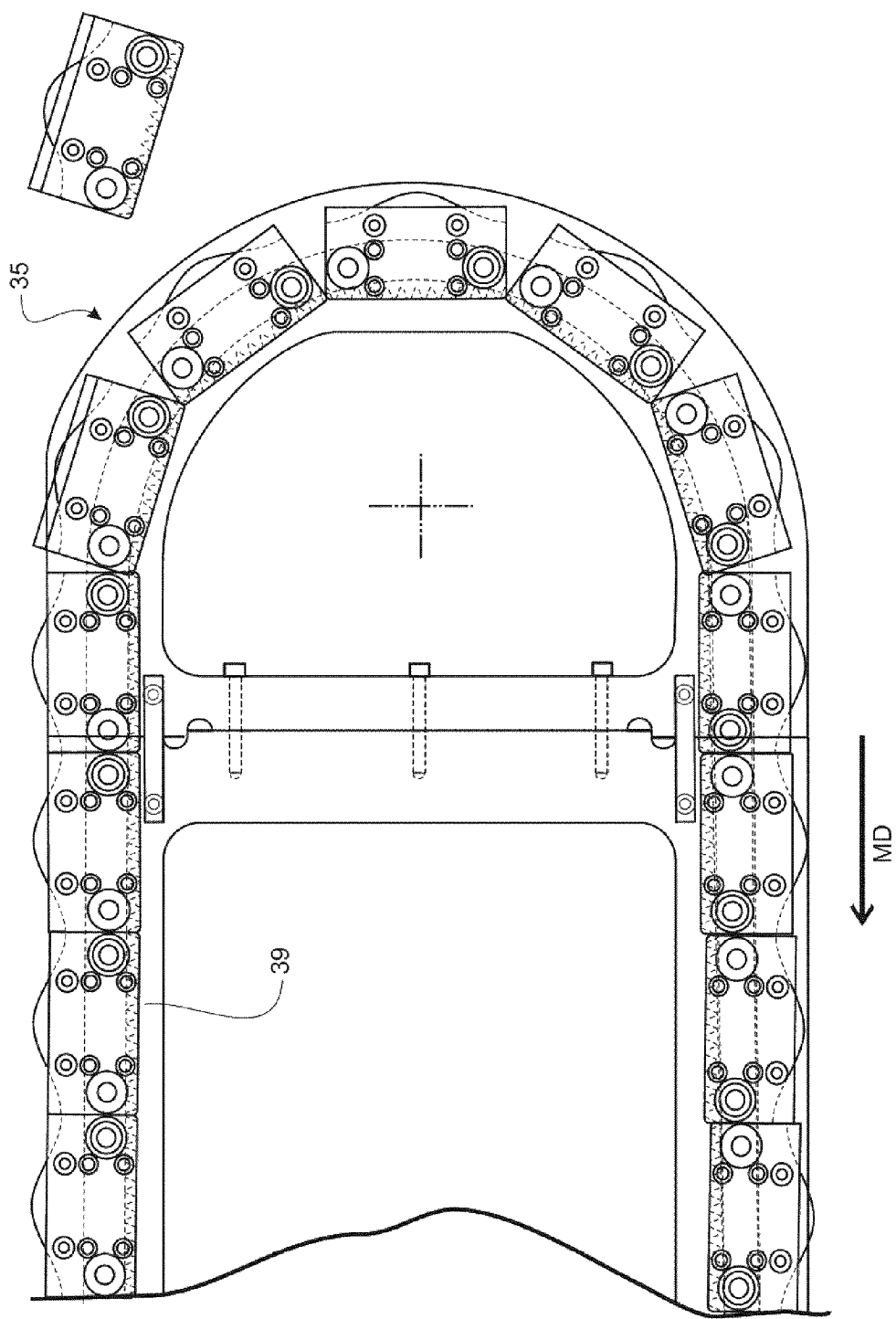
FIG. 14 shows the lower circuit (with left hand lower track frame removed) in one preferred embodiment whereby the forming tools come in to form the forming surface in a standard manner (for example that depicted in the prior art of FIG. 3a), that is with no lead in zone.
Figure 15A:
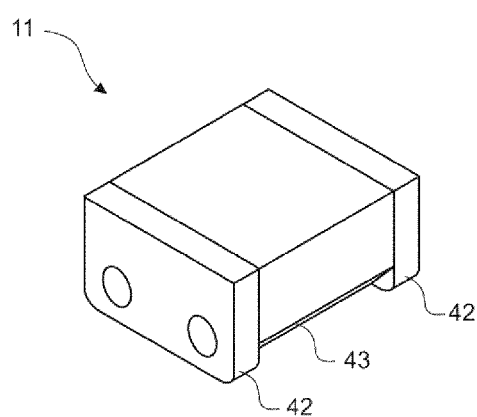
FIGS. 15a-15c show a side elevation of a forming tool with a hardened wear plate on the side and chamfered bolster and die, where
Figure 15B:
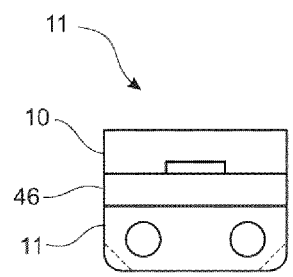
Figure 15C:
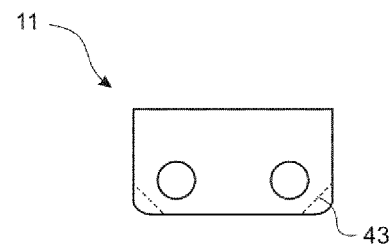
Figure 17A:
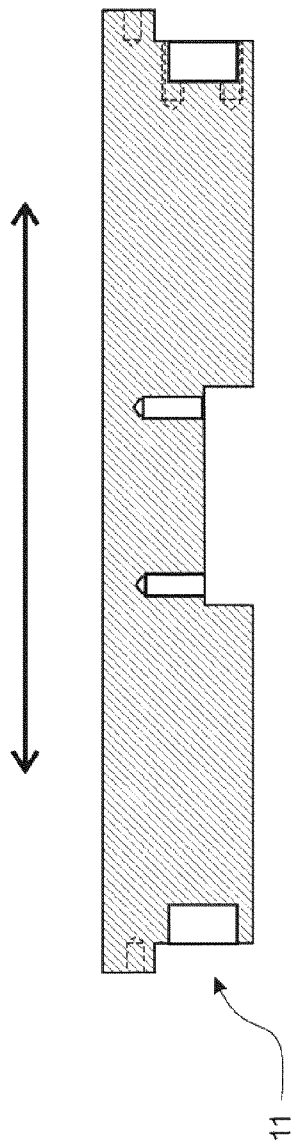
FIGS. 17a-17c show in end elevation at FIG. 17a a forming tool to run in the guide tracks, at FIG. 17b a plan elevation of the same forming tool and at FIG. 17c an end elevation.
Figure 17B:
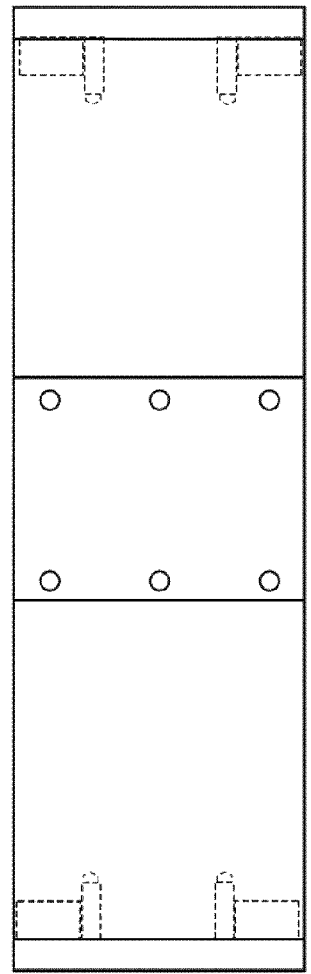
Figure 17C:
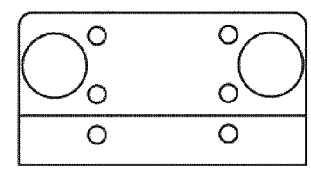

On any one individual forming tool the forward runner (33) is less spaced out from the forming tool than the backward runner (34), when viewed in the machine direction. In other embodiments it may be possible for this arrangement to be reversed. This allows the separate engagement by the forward runner (33) in the upper (31) and lower runner (34) in the lower (32) guide tracks in the lead in and lead out zones, as shown in FIG. 11.

In its simplest operation therefore the forming apparatus (1) has the first forming tool set (3) running in synchrony with a second forming tool set (4). The forming tool sets may be in phase or may be out of phase as indicated in FIG. 4 where it is shown the individual forming tools being out of phase by 180°. Whilst it is shown in that particular embodiment that individual forming tools are mating it is to be understood that their main purpose is to co-act whether forming tools are complimentary, mate with one another, or leave a large cavity zone between each other.

A first drive (7) is located at the interface of the pressure forming zone and lead in zone. By means of interaction with the forming tools the drive means propels the forming tools around the circuit. In one embodiment the drive means is an electric motor (or similar propulsion means e.g. hydraulic, electro-magnetic or similar) which drives the forming tools via a pinion (38) on the drive means, which mates with a rack (39) which is present on each of the forming tools, for example on the back of the forming tool. Whilst it is shown the drive means here is at the interface of the lead in zone and pressure forming zones it may equally be at any point on the circuit. A further secondary drive means (58) may be present to drive the forming tools to the first drive (7). Such a secondary drive means may be required to overcome friction of the guides and forming tools leading into the first drive. A similar second secondary drive (59) may be present to aid the second primary drive (8).

Additionally the forming tools as shown in the preferred embodiment are free relative to one another save for the guidance of the guide track (29).

In a similar way a second drive (8A) exists to drive the second die set (4) around the second die set guide (6). Whilst a second position (8B) is shown, the preferred embodiment places the second drive at position (8A). This is important when there is a lead-in zone on the lower or second forming tool set (4). In that particular embodiment the second drive (8A) is located at the interface of the lead-in zone and pressure forming zone of the forming tool set it drives. The synchrony of the respective die sets is controlled. This is achieved by comparing a sensor means on each of the respective guide tracks. The speed of each of the drive means then is sped up or slowed down dependent upon whether is lag or lead in the synchrony of the respective die sets. The control of the drives may be done through a computer or programmable logic controller that in turn controls the drives. Such control may be via for example an AC motor controller when for example the drives are AC motors. Other controllers will be appropriate for other drive technologies such as DC, hydraulic, magnetic etc.

Whilst there will be a set speed through the lead in zone, pressure forming zone and lead out zone the forming tools (50) may move faster in the recovery from the forming tool dis-alignment zone to being located back again at the forming tool alignment zone. This may occur where the total circuit length is greater than the total length of forming tools present. Additionally as earlier stated forming tools may be removed and other forming tools may be located in place. Of the two co-acting forming tool sets a first of these will be a reference drive from which the speed of the other die set is slaved. The synchrony of the two forming tool sets is then maintained as earlier described by sensors and controls. If the asynchrony between the sets exceeds a certain set point then a warning signal can be generated to indicate this to the operator or the system may be stopped completely if such exceeding of synchrony would be to damage the process or product.

The relative position of the first forming tool set (3) to that of the second forming tool set (4) is controlled so that the two can be spaced apart (for example by relative movement of their respective guides), brought closer together or removed from one or the other (e.g. for maintenance). This is achieved by hydraulic rams or similar locating means either lowering the first forming tool set relative to the second or raising the second forming tool set relative to the first. In this way additional pressure may be applied and this may be varied during the process or on a per-process basis dependent upon what the final product requires. The gap ("day light opening") between opposing surfaces can be varied from 0 mm up to 10 meters on larger machines.

In operations where the material itself creates the pressure in the pressure forming zone (e.g. by its own expansion or reaction) then the closing between the opposing surfaces of the pressure forming zone is fixed to create the required pressure.

Whilst herein the word circuit and continuous is used to be understood that these refer to the process only (even though it may be stop started).

The forming tools themselves may be removed from the circuit in a discontinuous nature by manual means or machine means so that there may be more forming tools stored than is presently in the forming apparatus. This may be the case where the requirement for forming tool type is changing through the process, more or less cooling or heating is required, or the form of the product going through the machine is changing for example the process may change from being for one type to another in the infeed materials may vary also.

The forming tools (11) (whether a unitary or composite) have on their edges wear plates (42). The wear plates are of a hardened or wear resistant material (e.g. hardened steel) and act as a wear interface for the forming tools against each other. They are rounded at their lower corners to enable smooth transition through the zones.

The forming tools (11) may have very slight forming tool chamfers (43) present again to aid movement through each of the zones. In order for the forming tools (11) to run in the guide track (29) and in particular to differentiate between the upper guide track (31) and lower guide track (32) the guide track followers (22) are displaced different lengths out sideways from the forming tool dependent on whether they are to engage the upper guide track (31), or lower guide track (32). In one preferred embodiment the backward runner (34) is preferably displaced further out the side of the forming tool (11) in that of the forward runner (33) such that the backward runner (34) engages the more further out of the two guide tracks (29) (the upper guide track (31)).

This is of course only one embodiment and the guide track followers (22) may be further in or out in front or back depending on the set up of the particular guide track (29). Several examples of different height guide track followers on the forming tool (11) may be in line as shown in FIG. 16b, or may be out of line as shown in FIGS. 16c and 16d and purely depends upon the disposition of the guide track (29).

The forming tool (11) when comprised of a separate carrier tool (25) and surface tool (28) can be subjected to temperature changes. When the carrier tool and surface tool are made of different materials (for example steel for the carrier and aluminum for the surface) then due to the different rates of thermal expansion there is relative movement between the two tools. If the two tool components were rigidly bolted to each other the result would be a bending or warping or buckling of the resultant structure. Therefore an expansion interface (46) may be present between the carrier tool (25) and surface tool (28). However at such an interface there is preferably a keying in of the carrier tool (25) and the surface tool (28) so that the forces can be transmitted between the two.

Figure 19A:
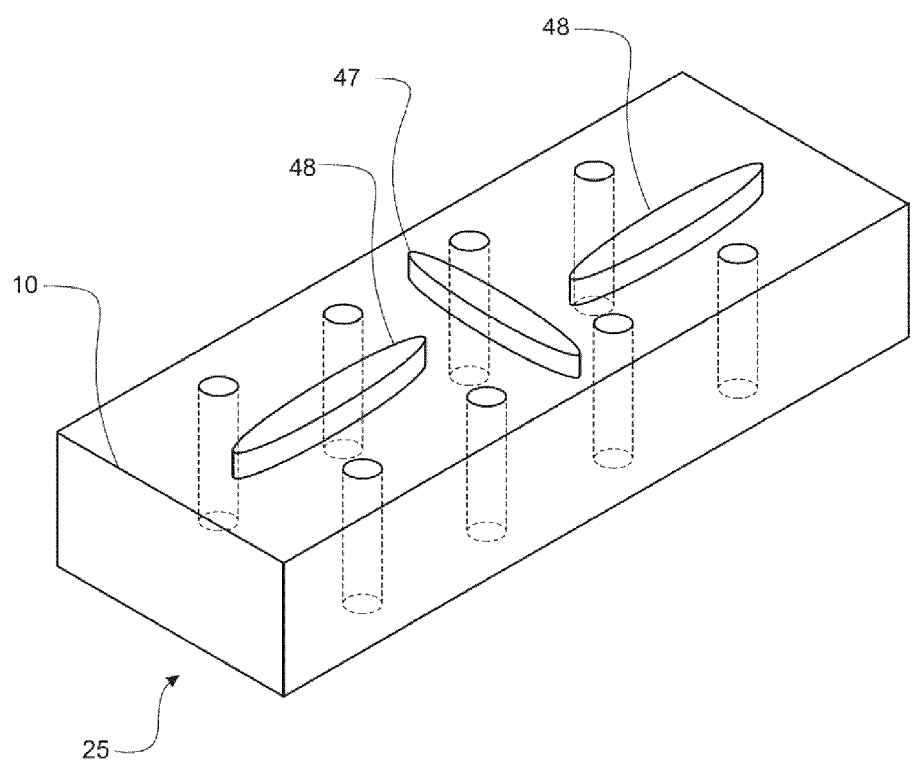
FIG. 19a shows in isometric view a bolster to which a forming tool can be attached showing the key system present between the die and the bolster which allows for thermal expansion of one relative to the other whilst still retaining the mechanical engagement of one to the other allowing transition of force in all three directions.
Figure 20:
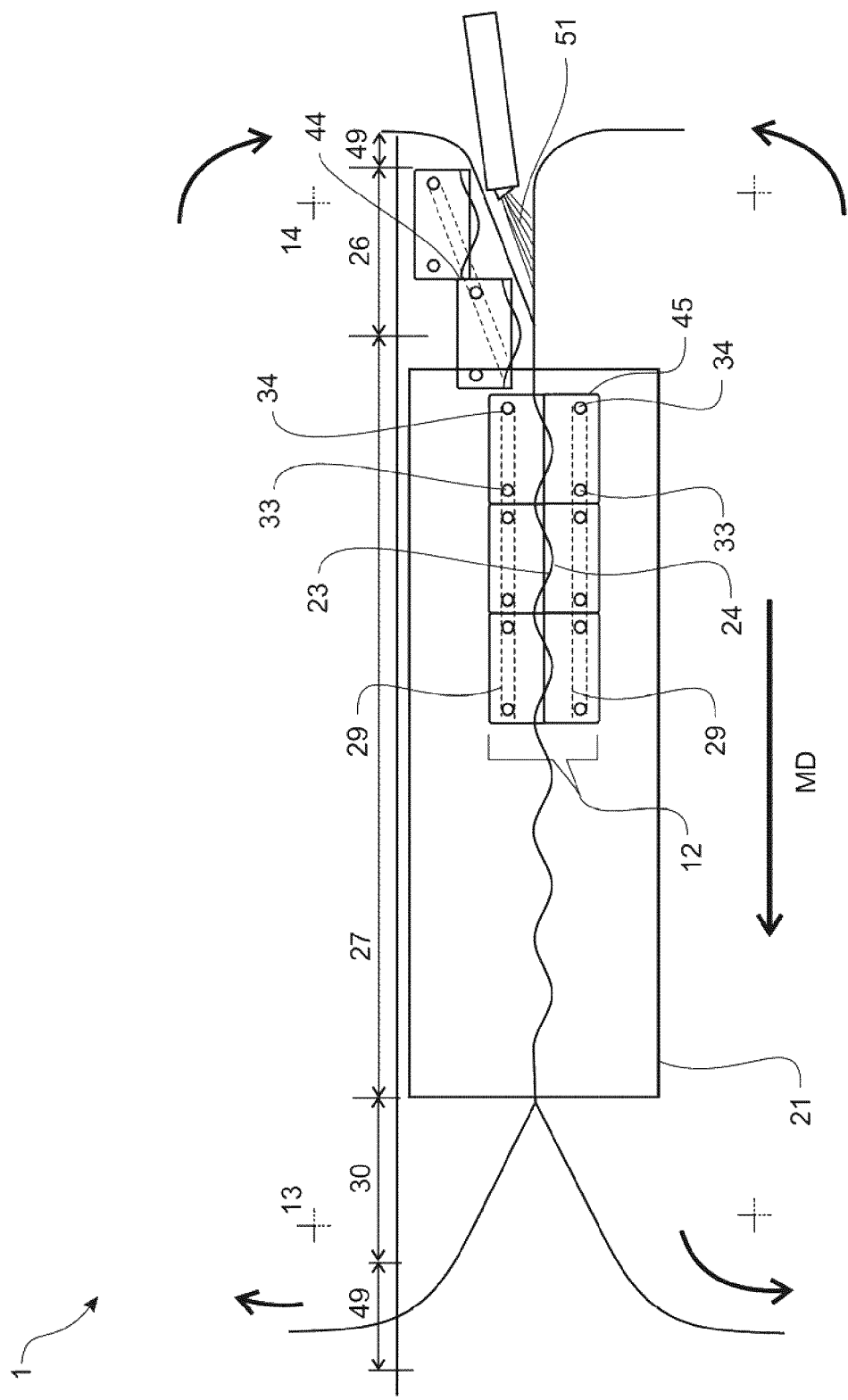
FIG. 20 shows in close up a side elevation of the lead in and pressure forming zones showing the application of material to be formed (for example by extrusion or spray extrusion in this case), and the lead out zone.

In one preferred embodiment this consists of a keying in parallel (47) to the machine direction and keying perpendicular (48) to the machine direction as exemplified in FIGS. 19a-19c. The keys (48) and (49) extend from the carrier tool (25) (in one embodiment) and engage with complimentary apertures in the surface tool (28). The apertures in the surface tool (28) may be slightly larger in size in a dimension parallel to the machine direction to the parallel keying (47), and slightly larger in dimension perpendicular to the machine direction for the perpendicular keying (48). For example on a tool that is 150 mm wide, at 80 deg C. ambient there is an expansion of 0.4 mm that needs to be taken account of The net result is that the surface tool (that is constructed with aluminum for example) can expand relative to the carrier tool (25) under thermal influence yet still be keyed in sufficiently to transmit the required mechanically forces.

There may also be present connection means between adjacent forming tools of the same circuit. This may be for example but not limited to magnetic, mechanical (e.g. linear bearings or dove tailing) or similar to ensure that there is no gap present between adjacent forming tools in any of the zones.

The forming apparatus (1) may also be driven intermittently in that infeed material may be introduced and then the motion in the machine direction stopped temporarily whilst some condition is achieved and then restarted. Therefore the term continuous really refers to the continuous availability of forming tools in the process and not necessarily a continuous motion. As alluded to the lead in zone (and the lead out zone) may be of any desired path whether linear, curved, or otherwise and in some such situations the "drop" that any one forming tool undergoes may be greater than its apparent thickness. In this situation forming tool extensions (52) may be present on that side of the forming tool (50) requiring such an extension. In some situations (e.g. that typified by FIG. 5c) there may be a requirement for whole forming tool extensions (52) on both sides of the forming tools (11) to ensure that the forming tool interface (44) is maintained between consecutive forming tools.

As can be appreciated when the guide track (29) is of a full or semi full circuit and the followers (22) reside within the guide track, there will be a tolerance such that the followers (22) may slide or rotate or whatever within the guide track (29), particularly under the action of gravity as they invert from one side of the guides to the other. As a consequence (and the forgoing is used as an example) when the forming tools (11) are for example moving along the upper part of the upper guide track 5, towards the drop point towards the forming tool alignment zone (49) they will bear on the lower surface of the guide track (29) as they move around into the forming tool alignment zone (49) they will change the bearing point to be on either or both sides of the guide track 29, and then on the lower surfaces of the guide track (29). As they move through the forming tool alignment zone into the lead in zone (26) under for example the action of gravity they will again bear upon the lower surface of the guide track (29). However as they enter into the pressure forming zone since they will be imparting pressure to the infeed material which will lie between the upper forming surface (23) and lower forming surface (24) then the upper forming tool set will be forced upwards and the followers (22) will bear upon the upper surface of the guide track (29). So it can be seen that over the course of a rotation "or a cycle" from lead in zone back to the lead in zone the forming tools (11) and in particular the followers (22) will bear upon different aspects of the track.

The forming apparatus (1) as indicated may be in any particular orientation and the use of upper and lower in the foregoing description is only a relative description purposes. In a situation where gravity would not be able to feed forming tools (11) into the forming tool alignment zone (49) then there may be present a further drive (e.g. the secondary drives 58 and 59) as required to urge the forming tools (11) to which ever zone they are required.

The presence of chamfer on the leading and trailing edge of each of the forming tools is required at least in a situation where there is no lead out zone and the forming tools merely rotate away (similar to the that of the forming tool alignment (49) and/or dis-alignment zone). The presence of such a chamfer will prevent the forming tools rubbing or interfering with those other forming tools above (dealing with a forming tool on the lower track) or those below (dealing with a forming tool on the upper track).

As alluded to, the forming tools may be subject to temperature variation. As a result there will be expansion and or contraction of forming tools relative to one another, relative to the guide track in which they are to operate and also of the forming tool components. The net effect therefore will be the increasing and decreasing of the total length of the forming tools available. If there was no variation in the guide track length allowed for then the total length of the forming tools may exceed the length of the guide track and thus damage would result. There is therefore tolerance greater than the expected total thermal expansion or contraction of the forming tools (and/or the frame) to accommodate such expansion and/or contraction.

In certain applications there is the need to obtain high clamping pressures between adjacent dies. Such high clamping pressures, for example clamping pressures of 260 kg/cm2 (approximately 25 MPa) may be needed where injection moulding processes are present in or near the pressure forming zone 27. In some applications the forward runner (33) and the backward runner (34) may be strengthened together with their respective guides. However in high clamping operations this is bulky, expensive and largely unnecessary as the high clamping pressure is only required in the pressure forming zone 27. Such forces may exceed also that that can be imparted (e.g. by hydraulic, mechanical, pneumatic etc.) on the guides and thus the followers of the forming tools.

In the preferred embodiment where high clamping pressures between co-acting forming tools are required a pressure plate 100 is present in the pressure forming zone 27. In the preferred embodiment there are two such pressure plates, a top pressure plate 100 and a bottom pressure plate 101. These lie at least within a substantial portion of the pressure forming zone 27 and in the preferred embodiment extend over its entirety.

Figure 24A:
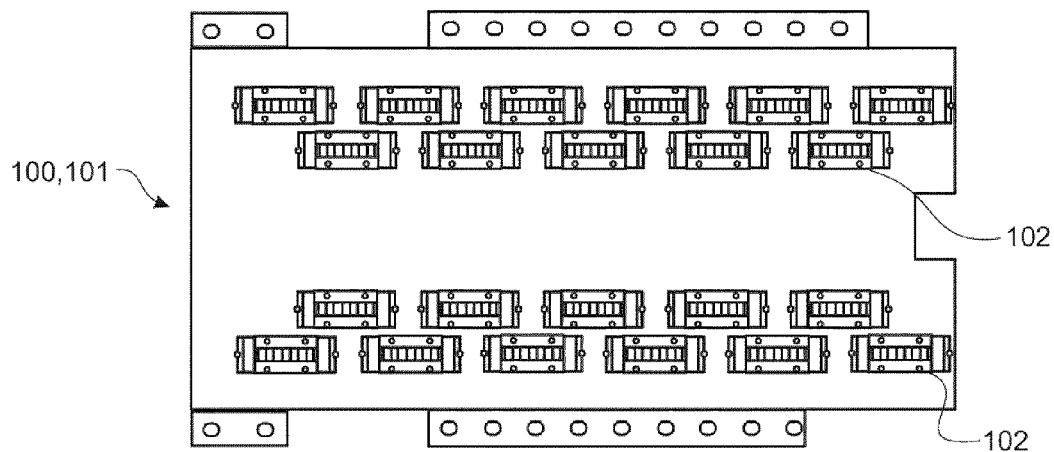
FIGS. 24a-24d show the pressure plate including at FIG. 24a in plan view, FIG. 24b in side elevation and FIG. 24c in end elevation.
Figure 24B:
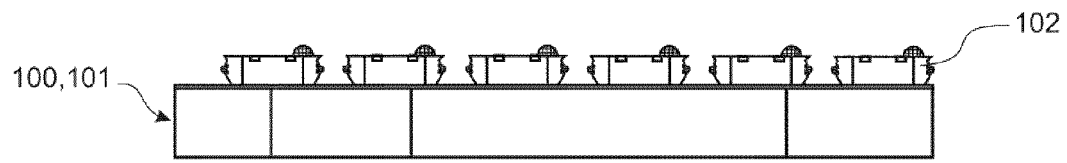
Figure 24C:
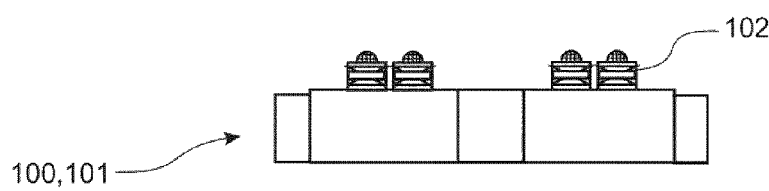
Figure 24D:
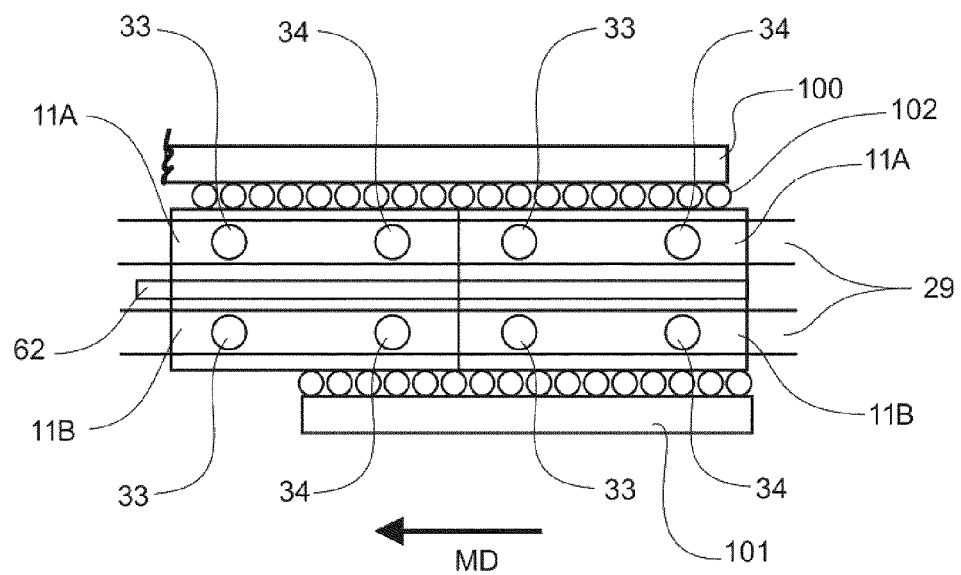

In the preferred embodiment the pressure plate consists of load bearings 102 that bear on the lower surface of lower forming tools (11B) and the upper surface of upper forming tools 11A. In the preferred embodiment the load bearings (102) are arranged in an overlapping array formation as shown in FIG. 24*a*. This provides a constant and substantially even pressure against the forming tool (11) currently passing over or under them. In other embodiments there may be one large continuous load bearing over the substantial area of the pressure plate (100), or there may be two long thin rows or any combination of high load applying bearings. In other embodiments the pressure plates may be provided by a load bearing surface, whether of slides or liquid (e.g. an incompressible fluid such as water).

In the embodiment shown the load bearings (102) are recessed into the plate (100), (102) to give the plate a low profile. The main requirement of the pressure plate is that it is sufficiently rigid to resist the load required to be applied to the forming tools). In other embodiments the pressure plate may be separate for each of the arrays if required, or may be part of the forming tool set guides either side of the forming tools. In other embodiments the pressure plates may be additionally supported by internal frames of the guides.

In use the forming tools (11) come into forming tool alignment zone 49 and then into the lead in zone 26 as earlier described. As they enter the pressure forming zone 27 they encounter the load bearing(s) 102. If the pressure plate was not present the runners of the forming tools would run in the guides to place the pressure on the dies. However with the pressure plate there the runners are moved vertically clear of the guides.

The runners of the lower forming tools 11B are lifted clear of the guides by the upward urging of the bottom pressure plate 101. The runners of the upper forming tools 11A are lowered clear of the guides by the downward urging of the top pressure plate 100. As the upper forming tools and lower forming tools meet each other in the pressure forming zone they (and the material 62 to be formed) are essentially "sandwiched" between the top pressure plate 100 and the bottom pressure plate 101.

The force or pressure that can then be applied to the forming tools and material 62 to be formed in the pressure forming zone 27, is then only a function of the force that can be applied to the pressure plates 100 and 101 and the pressure that they can withstand.

To aid the movement of the forming tools 11 the pressure plates 100 and 101 may be angled. For example the top pressure plate 100 may be angled upward at or toward the lead in zone 26 to the pressure forming zone 27. The same may occur in the transition from the pressure forming zone 27 to the lead out zone (30). This will aid the entrance and exit of forming tools and will also apply the pressure gradually to the forming tools. Similarly the bottom pressure plate may be angled downward at or toward the lead in and lead out zones.

Further methods of creating greater pressure in the pressure forming zone may involve magnetic elements that attract each other across the pressure forming zone the create high pressure. The same can be achieved for locking adjacent forming tools together. The magnetic force may be varied in known ways to achieve the required force between co-acting and/or adjacent forming tools.

In further applications of the present forming apparatus 1 there is a requirement to keep matching adjacent and/or co-acting forming tools, aligned very precisely to each other. This is desirable when the form to be imparted to the material is required to be indexed either along the pressure forming zone, or either side thereof. Such alignment can be of adjacent forming tools in the set to each other vertically and horizontally (perpendicular to the machine direction MD) and also of co-acting forming tools above and below the pressure forming zone. In some situations it is desirable to lock both successive dies 25B and 25C together as well as the dies they co-act with below or above as the case may be.

Such alignment in one form can be achieved by use of lasers and grid markings, or by measurement of forming tools in the pressure forming zone and their relation to one another and then adjusting the relative location of the forming tools (e.g. by advancing or retarding the drive or one or more forming tools or sets of forming tools).

Figure 25:
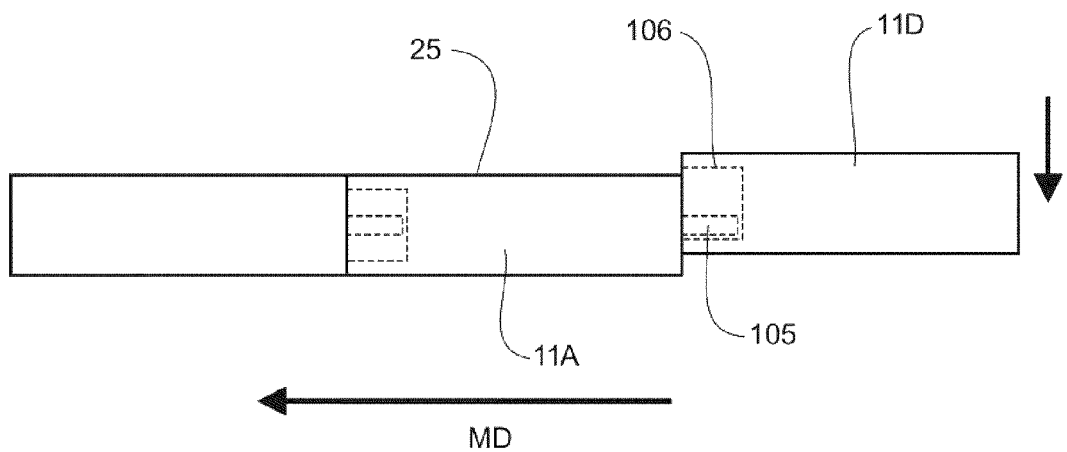
FIG. 25 shows a number of successive dies or forming tools of a set (in this case an upper set) at the lead in zone, and the interlocking thereof.

In the preferred embodiment such alignment is achieved by physically locking adjacent forming tools together. This can be achieved by a lock that only locks in one dimension, for example a pin 105 in a slot 106 as shown in FIG. 25. The slot opens toward the forming tool forward of it and its width-wise axis is horizontally oriented. The slot 106 is substantially the same width as the diameter of the pin 105. Therefore the pin and slot as shown in FIG. 25 can only move vertically relative to each other, and cannot shear in a manner transverse to the machine direction MD.

To enable engagement of successive forming tools 11A and 11D the length of the pin 105 cannot be longer than the depth of the slot 106, unless the slot 106 is further opened away from the curve locus of the lead in zone 26.

Figure 26A:
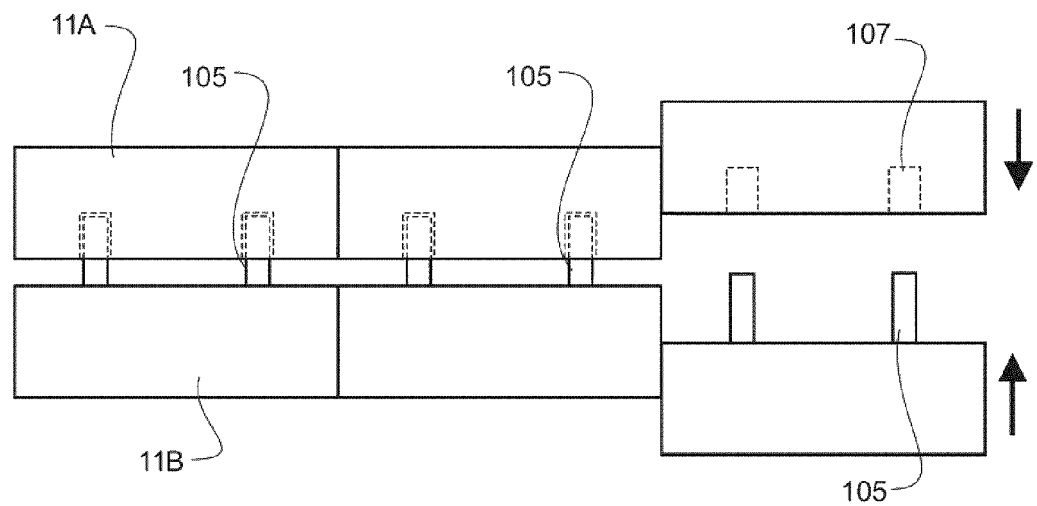
FIGS. 26a-26c show similar views to FIGS. 24a-24d where

In a similar way as shown in FIG. 26*a* co-acting forming tools above 11A and below 11B each other are locked together by a pin 105 locating in a hole 107 of substantially the same diameter. In this way co-acting forming tools cannot move relative to each other in the horizontal plane (i.e. in the plane of the pressure forming zone 27).

In such instances where locking is required the head of the pin, or taper is shaped to allow easy mating with the hole or slot it is to lock with. Additionally the slot 106 or hole 107 may also be shaped to allow easier mating initially.

Figure 26B:
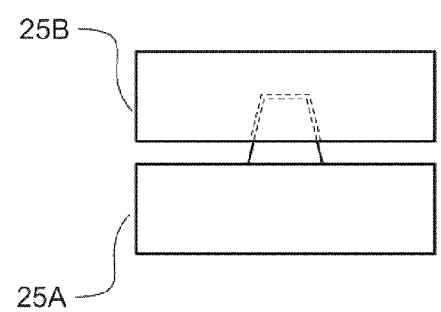
Figure 26C:
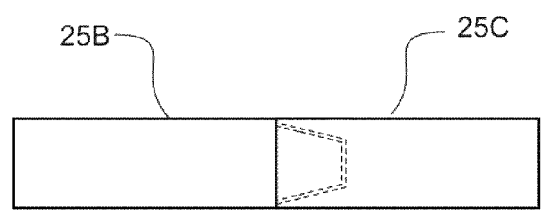
Figure 27D:
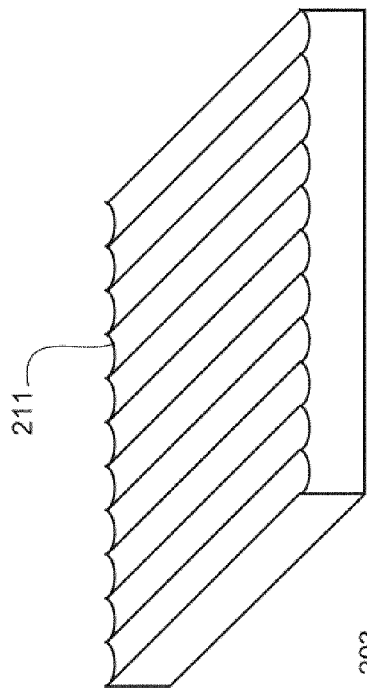
FIGS. 27a-27f show at FIG. 27a a roofing tile made from the apparatus and or method of the present invention.
Figure 27E:
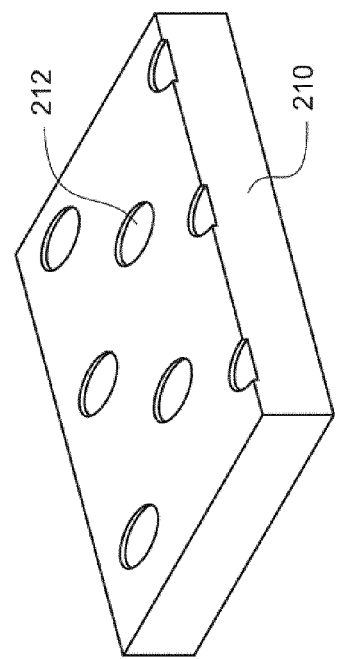
Figure 27C:
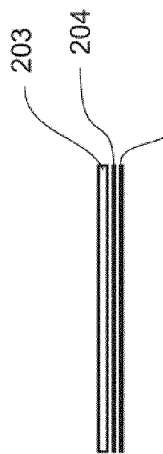
Figure 27A:
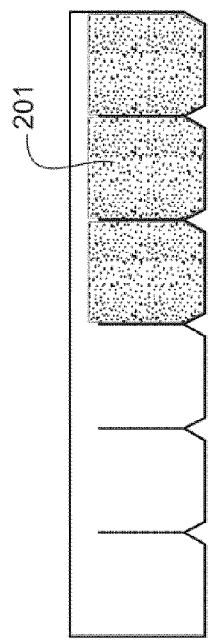
Figure 27B:
Figure 27F:
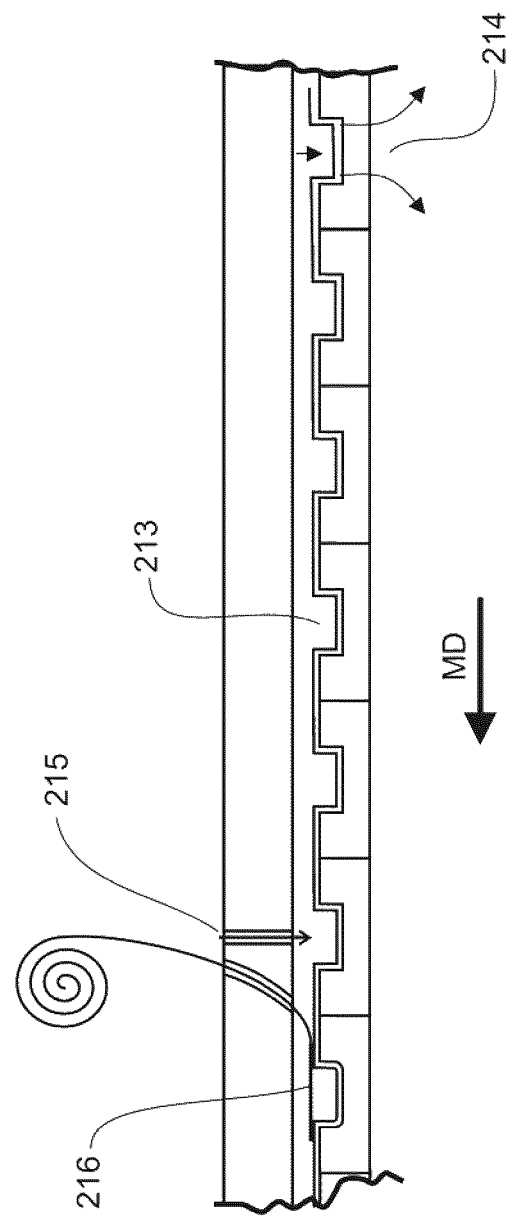
Figure 28:
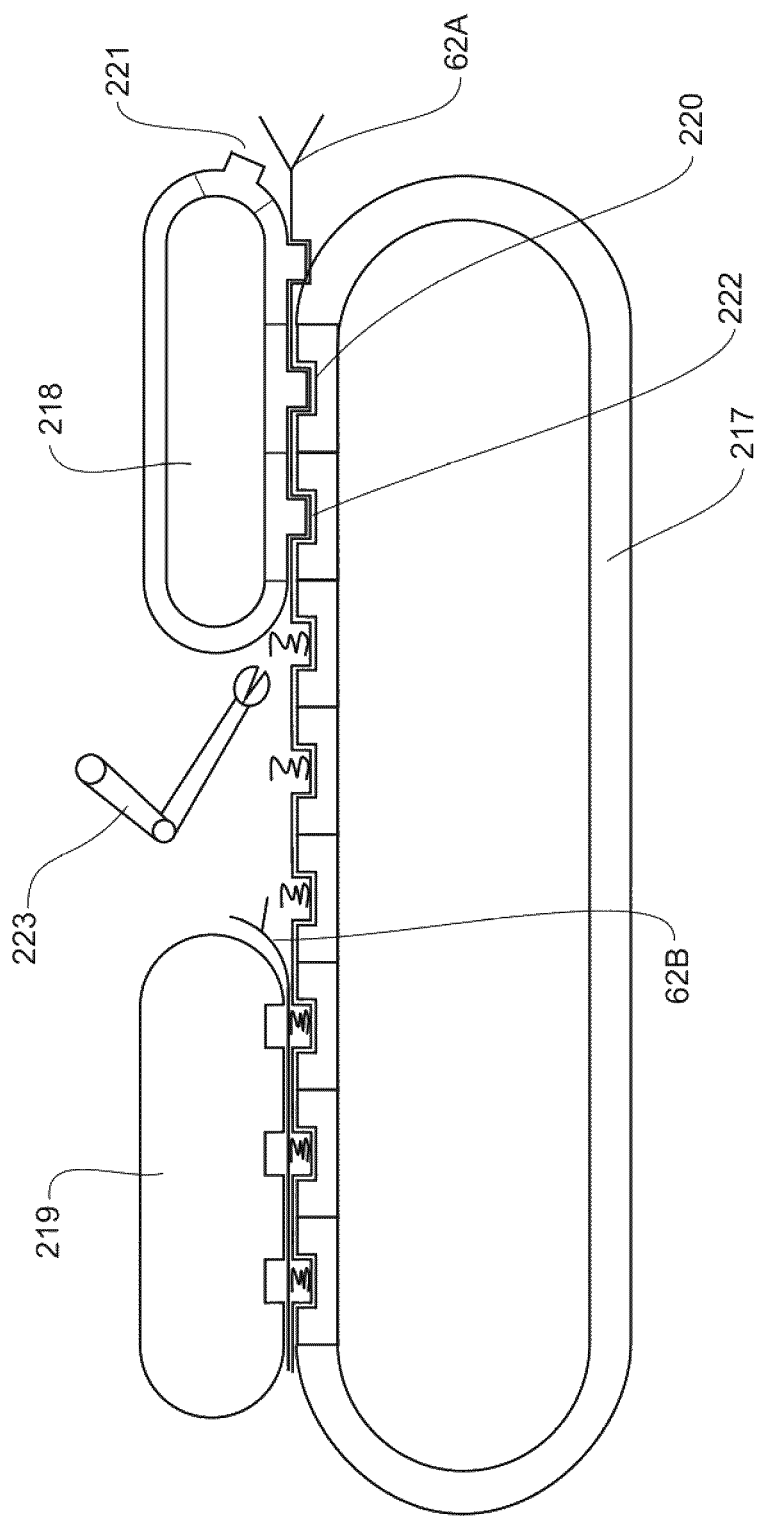
FIG. 28 shows in close up side on view the pressure forming zones as they may be adapted to form a photovoltaic cell.
Figure 29:
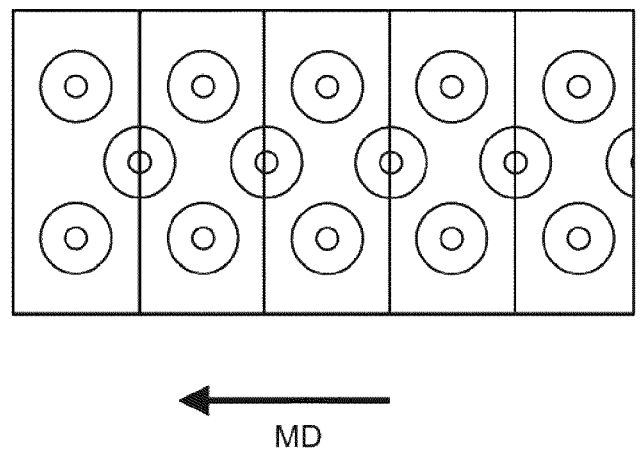
FIG. 29 shows in plan view one set of forming tools (either bottom or top) for making optical media such as CDs and DVDs.
Figure 30:
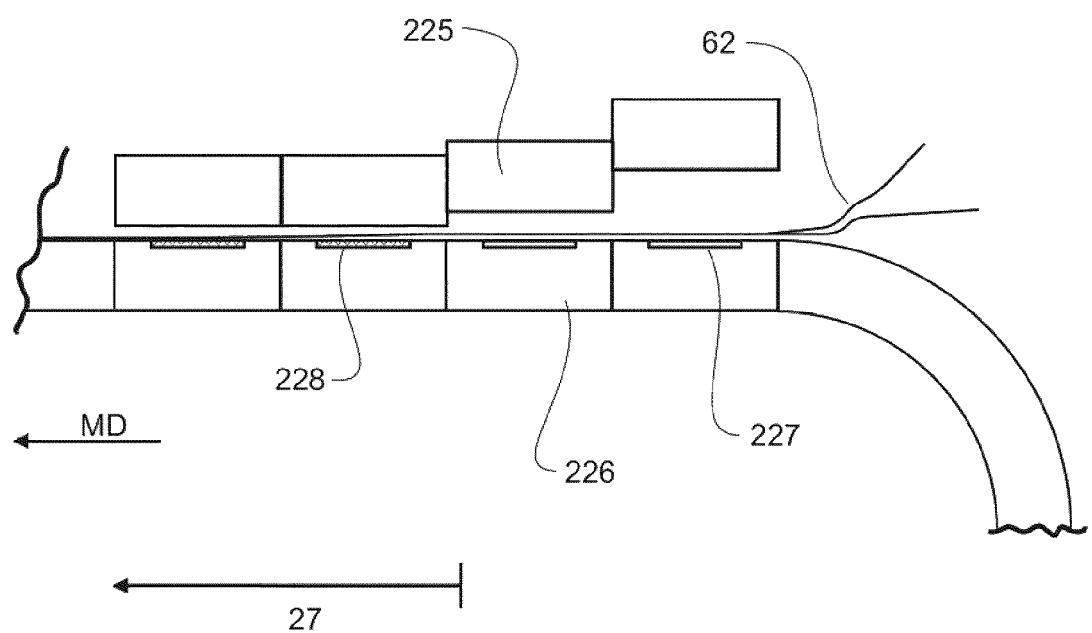
FIG. 30 shows in close up the pressure forming zone as it would be adapted to form optical media.
Figure 31:
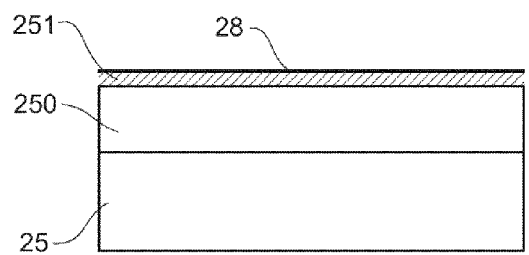
FIG. 31 shows in side view a composite forming tool having a very thin surface tool located to an intermediate tool and then to a carrier tool, such a surface tool being referred to as a stamper tool and would be used for applying very fine textures in the 1 micrometer and up range to materials, As used herein the term "and/or" means "and" or "or", or both.

In the most preferred embodiment the locking system between successive and co-acting forming tools is with a Morse taper as shown in FIGS. 26*a* and 26*b*. The taper allows easy initial mating and then locks tight when the two forming tools are brought under pressure—either by the clamping force of the pressure zone or the driving force of one forming tool successive to another.

Method of Use and Process of Manufacture

The apparatus has a machine direction MD and has on at least one forming tool circuit the key zones of a forming tool alignment zone (49), lead in zone (26), pressure forming zone (27). Optionally a lead out zone (30) is also present on that circuit. In other embodiments the lead in zone may be provided on one circuit and the lead out zone provided on another circuit (for example the lead in zone may be on the upper forming tool circuit and the lead out zone may be on the lower forming tool circuit). In other embodiments still there is a lead in zone on both circuits and also a lead out zone on none, one or both of the circuits. Typically immediately after the lead out zone is a forming tool dis-alignment zone 63.

The speed of such a system can be from anywhere from just over 0 meters per minute up to 1000 meters per minute. In preferred embodiments this range is between 2 and 100 meters per minute and the exact set point will be dependent on the end feed material characteristics together with the processing of that material.

The pressure forming zone 27 has, as the name suggests, at least pressure applied between the two opposing forming surfaces (which between them form a forming cavity) and may additionally have temperature or a temperature profile applied which is applied to either heat or cool the resultant product in the cavity. The thermal control of the apparatus (and at least the pressure forming zone) is achieved by a temperature control system. There may be separate systems for bringing the forming tools to temperature (whether above or below ambient), maintaining the ambient thermal fluid about the forming tools, and for the temperature profile control in the pressure forming zone. Alternatively they may be the one system controlling different zones and working fluids. The working fluids that can be used to control the temperature can be water, air, gas, oil or similar working fluids known in the art. The temperature control systems are those known in the art also.

The temperature may be controlled by spraying or blowing the working fluid onto or through the area to be controlled. For the forming tools there may be a thermal circuit within it that can receive a working fluid to control the forming tool temperature. In other embodiments thermal control may be achieved electrically e.g. by heater elements or Peltier effect cooling elements. For example as the forming tools move over the circuit they can become engaged with varying thermal fluid delivery devices to deliver thermal fluid into a port of the forming tool and flood internal cavities of the forming tool.

The material 62 to be formed can be supplied by extrusion on to for example the lower forming tool surface and may be laid at any point up to said pressure forming zone. Pressure may then be created on the material by either its own expansion or its entering a reduced space of the pressure forming zone to effect its forming. In other methods discrete shots of material 62 can be laid on the forming surfaces and thereafter formed upon entering the pressure forming zone.

Whilst there might be a number of varying infeed materials 62 to the forming apparatus (1) at least one of these must be able to be affected or acted upon by the pressure forming zone. Such action may be catalysed, created, or formed by the action of pressure and or heat but the end result is that at least that one infeed material has a formed change imparted to it. For example a ductile material such as a sheet metal may be feed in with various infeed materials above and below it and the metallic material or malleable material is thus formed into the desired shape in the pressure forming zone and regardless whether the other infeed materials are affected by the pressure forming zone provided that at least that one infeed material (in this instance is sheet metal) is achieved then the object of the invention will be achieved.

Further example materials that may be fed into the forming apparatus (1) are as follows. Various thermal formable materials may be used such as but no limited to polystyrene, high impact polystyrene, polycarbonate, aquilobutalstyrene (ABS), nylon, and all acrylics and not just those limited to crystalline polymers. Various thinner plastic materials may be used such as amorphous polymers but not limited to amorphous polymers and may be for example polyethylene (PE), low density polyethylene (LDPE), low low density polyethylene (LLDPE), thermo-plastic urethane (TPU), thermoplastic ethylene (TPE) and polypropylene (PP). For example there may be a polypropylene from 1 to 20 layers fed into the machine and with the appropriate dies in place there may be plates and bowls or similar dished or shaped materials formed. Further thermoset materials may be used such as rubbers, phenolic and the like.

The basic breakdown of materials that may be formed in the forming apparatus (1) are those that will retain shape or take on a shape or imprint under pressure alone (for example malleable or ductile metals, plastics or alike) thermo plastic compounds that require heat to enable them to be formed, thermo setting compounds that require heat or some other form of catalyst in addition with pressure can be formed, or in general thermo formable compounds that require heat and pressure to allow formation thereof. As an example a rubber can be pressure formed but also with the addition of heat may facilitate further cross linking of the rubber molecules so that one the pressure and heat are removed the shape imparted to the rubber material is retained. In other infeed materials it may be the pressure which forms the material and the heat which sets the material off for example in thermo setting materials or two pot or more materials which require heat as a catalyst.

For example an infeed of pre impregnated carbon fibre could be one such infeed material the application of pressure forming the material and the application of heat setting the material off and curing the matrix or a proxy. One of the important aspects of the present forming apparatus (1) is that if the material to be formed is incompressible in its solidified state then to avoid damage to the apparatus and to maintain a viable cleaning process the infeed material should be in a molten or semi-molten or a pliable state prior to the heat forming zone. As it passes through the heat forming zone the varying temperature profile that is applied will allow or may allow the product to form and set.

The reason for incompressible material to be made molten or pliable state is relatively obvious when one considers that with the application of pressure to an incompressible material damage will result unless either the apparatus or the material can move. In some instances where there is a likelihood of an incompressible material becoming solidified then the upper and lower forming surfaces may be movable relative to each other such as in the embodiment where the frames are movable relative to each other via hydraulic or bellows means which is maintained at such a pressure to allow a blow off or fail safety to be present so that relative movement of the two is permitted if a certain pressure threshold is exceeded. In some emergency situations or when a certain threshold pressure is reached the lower guides and forming tool may be dropped in relation to the upper forming tools to relieve the pressure.

When one of the infeed materials is polycarbonate or a similar rapid solidifying plastics material (or the like) that shrinks upon solidification then there is a general pulling away from the die. This can be countered if, for example, the dies form a pinching zone at or near this stage of solidification so that there is a reduction in mould cavity according to the approximate shrinkage rate of the material upon the solidification. This aids to support the material where it may be solidified yet still in a fragile state.

For materials that are compressible whether they have solidified or not it is an advantage to lock the two forming guides, the upper and lower forming guides relative to each other, where the material is incompressible upon solidification, it would be desirable not to lock the upper and lower forming guides relative to each other. This is because to lock the guides relative to each other for an incompressible material will result in buckling and possible failure and breakage whereas in a compressible material will deform and therefore not result in breakage.

The pressure forming zone (27) may in one embodiment have an initial zone where temperature is maintained so that the infeed material is in a formable and pliable state, thereafter pressure forming of that molten or pliable material, following this a region of cooling may occur and this will lead to a formed and set material. The pressure forming zone may therefore be described as a compaction or pressure form zone, a compaction or pressure form zone transition to forming, a cooling and forming hold zone and thereafter a release in transition to the lead out zone. It is to be understood that the pressure forming zone is at least in part a form holding zone and the various other parameters required to achieve this on the infeed material will be present for example as discussed heat but also the addition of other chemicals or gases, cooling, or any other catalyst or condition present to act upon in the infeed material.

The infeed material may undergo a pre-process prior to entering into the forming apparatus (1) or as part of the forming apparatus whereas pre-gauged to a desired material thickness for the process when its time to go. Whilst herein the term forming has been used this is to be understood to be 3D in nature may also be imprinting or merely the application of a surface finish whether this is laminated or formed into the product or created in the product as a result of any of the material conditions therein. It may for example be that the use of a chemical introduced into the infeed material at some point of the process will result in a differing material finish.

In its simplest form the forming apparatus has been described as having an upper track and lower track. These may be of course the same length or may be of unequal length. Further variations of this however are envisaged for example where there are multiple top stations, meaning there is one single lower die set and disposed above that are multiple upper die sets. A further variation on this again would be the interposing of other processes between the multiple top stations to achieve for example addition of further material, objects or similar. Such other processes may annealing or seal or cure or add to the materials present, change their form or possibly even remove (for example punching or die cutting).

Yet another variation again is multiple forming apparatus interposed with other processed for example a full forming apparatus consisting of an upper and lower track, a process in between for example further annealing or heating, thereafter followed by a further forming machine further process and further forming machine. Whilst this has been referred to as upper multiple tracks and singular lower tracks it could of course be the opposite or there could be partial overlap of tracks and similar. There may further be an association with the forming apparatus the presence of injection units whether these move or do not move with the forming tools (11) such injections units may serve to form injection moulding, blow moulding or filling of cavities with fluids (for example food stuffs, operative liquids and so). In the situation where the injection unit is moving it will shuttle back and forth after it is filled and performed its operation and there may be multiple injection units to cater for the fast flow speeds. The apparatus can also be used to form food stuffs, for example doughs and solidifiable product. For example ice-cream can be injected into a mould and then frozen off. The apparatus may also be used for manufacturing an array or encapsulated articles, e.g. photo voltaic cells, imprinted articles, e.g. CDs and DVDs (blank and including imprinting the information on the media), screens for LCD devices, roofing tiles, gaskets and similar. Three dimensional deep forms such as cups can be vacuum moulded into the material, materials introduced into the formed cavity and then the cavity and material sealed (e.g. food stuffs sealed in containers).

In yet other embodiments there may be one of more forming tools sets operating on a common lower forming tool set as shown in FIGS. 21*a*-21*j*, with operations such as pick and place etc. occurring between each forming tool set. Alternatively there may be several discrete sets of forming tools apparatus with processes occurring in between (such as additional moulding etc.).

Figure 21H:
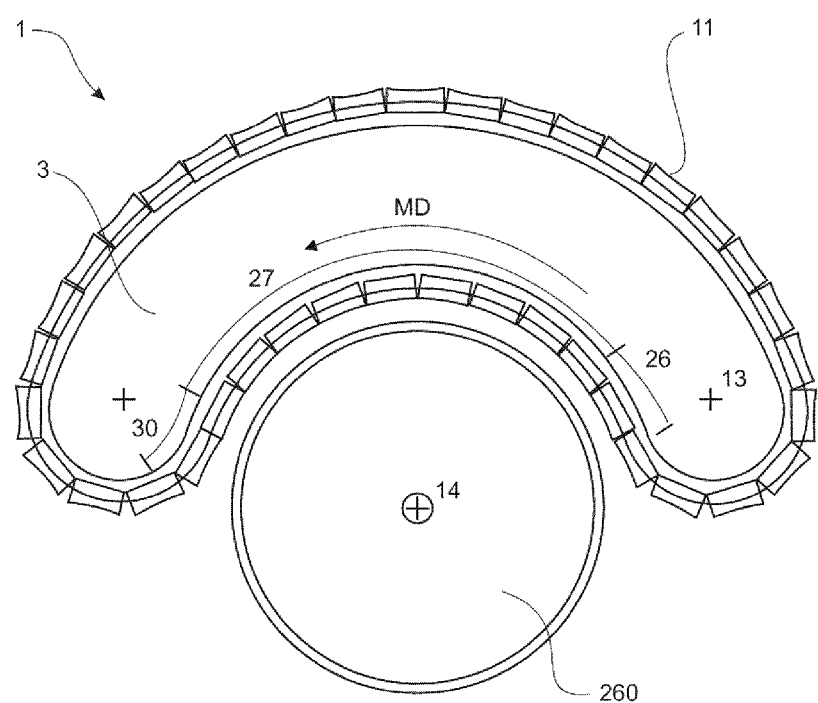
Figure 21I:
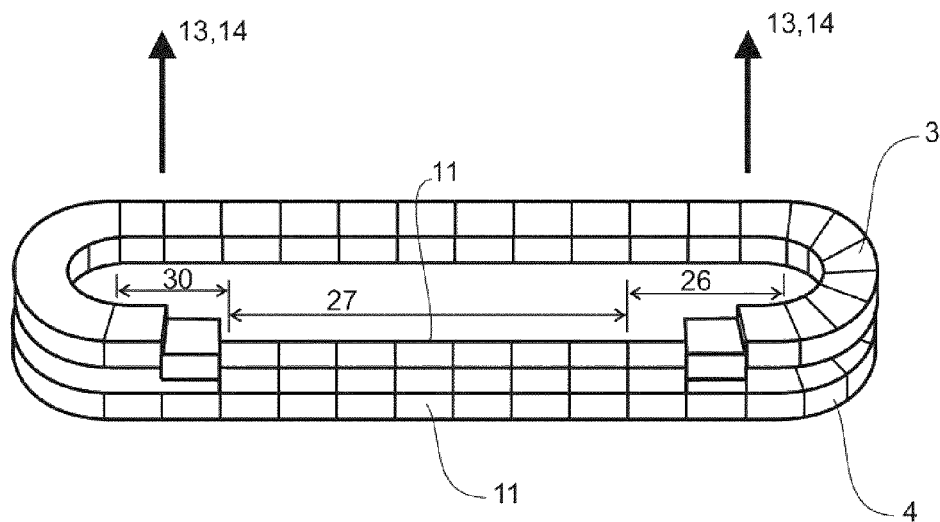
Figure 21J:
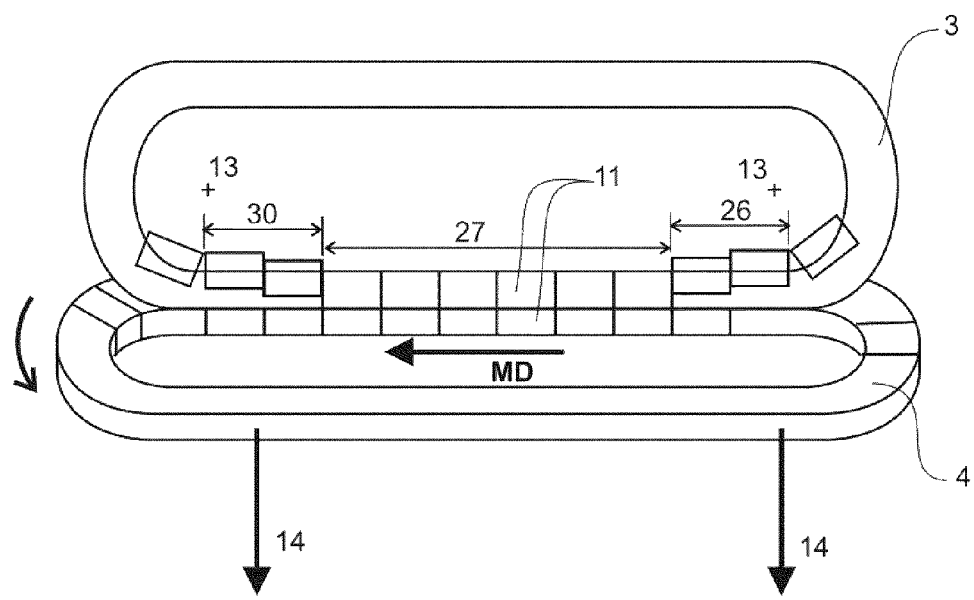
Figure 22A:
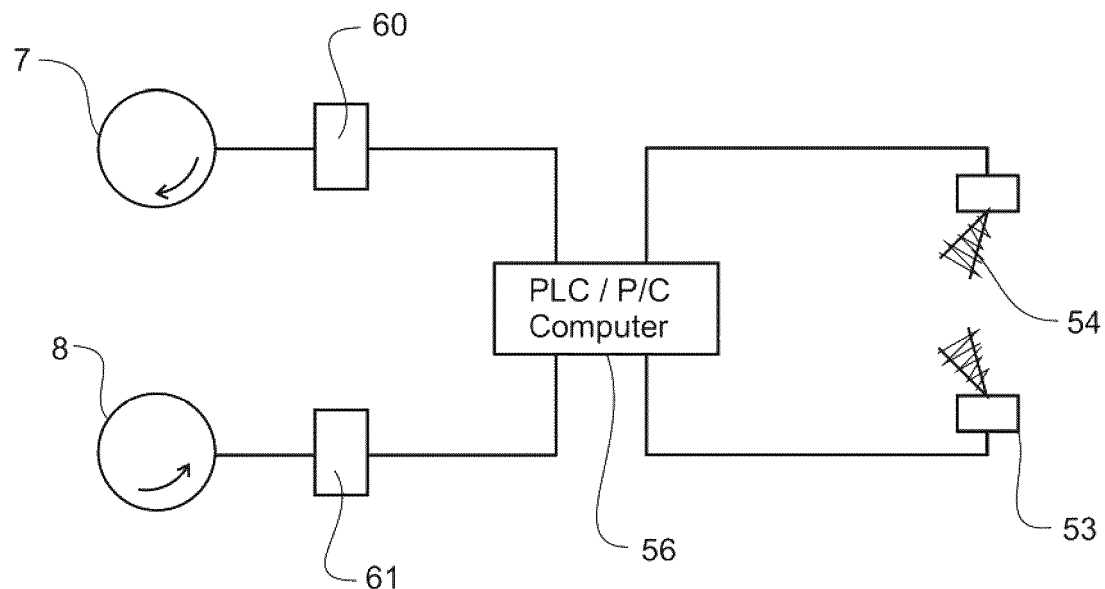
FIGS. 22a and 22b show a schematic of a control system to match the drive of the slave die set to that of the master die set including at FIG. 22a and at FIG. 22b showing the comparison made of the master and slave forming tools and showing the die asynchrony and match point.
Figure 22B:
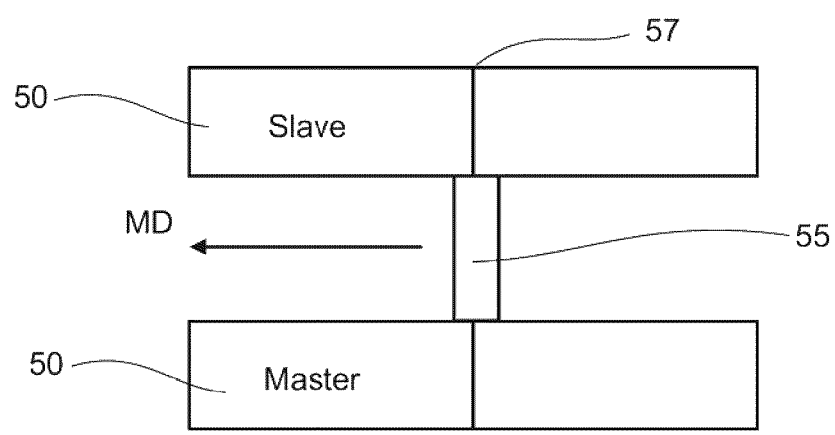
Figure 23:
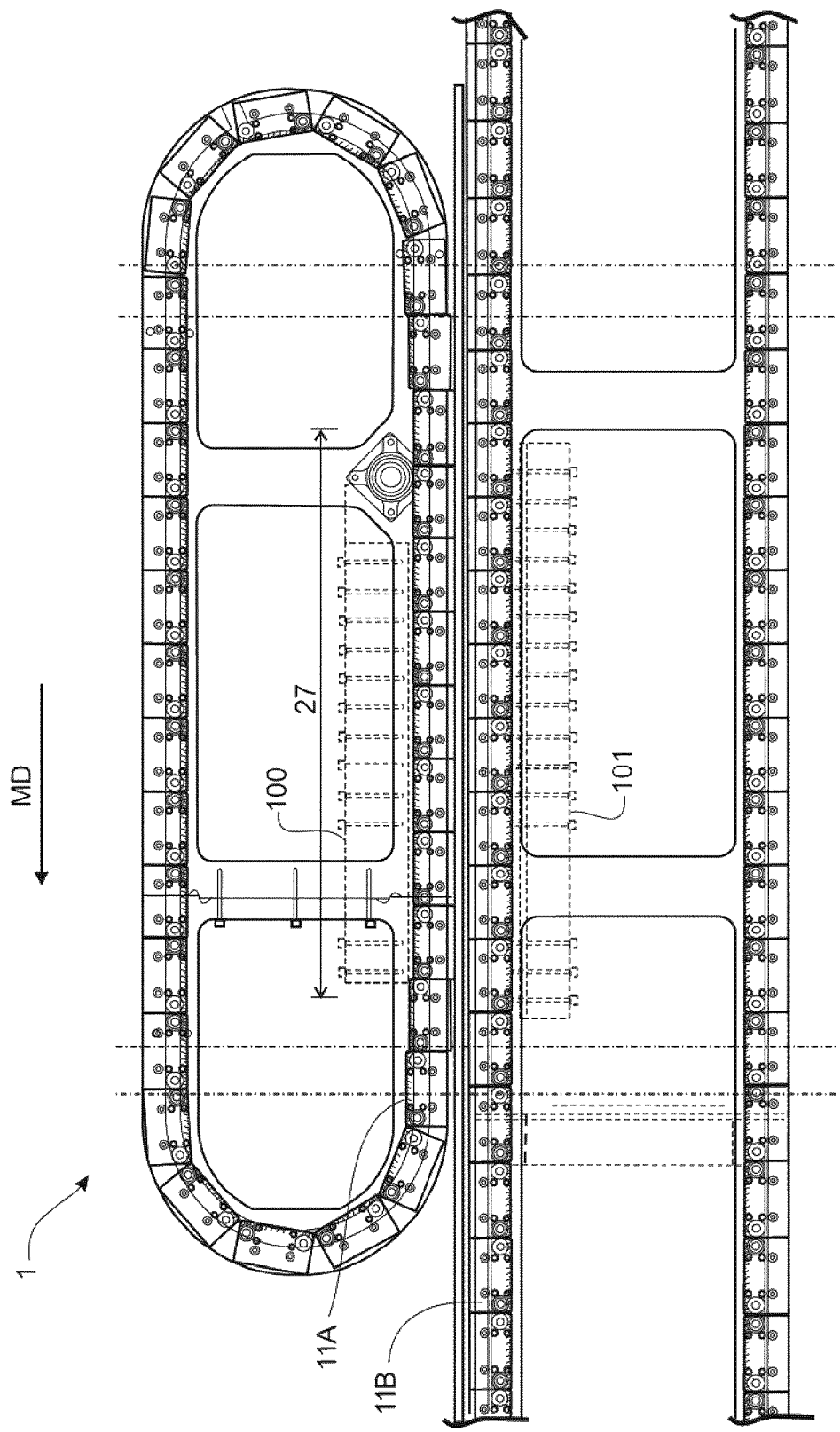
FIG. 23 shows a side view similar to that of FIG. 1, showing the pressure plates in location and the dies, tools, or bolsters that tools are mounted to or from bearing against the pressure plate either side of the dies that lie in the forming zone.

In a further embodiment one of the forming tools sets is a substantially planar conveyance system of forming tools as shown in FIG. 21*j*. The upper forming tools set (3) is a normal circuit, whilst the lower forming tool set (4) is a planar array of forming tools (11). This the general movement of the lower set of forming tools (4) is a recirculation in a horizontal plane, whilst the upper set of forming tools is a recirculation on the vertical plane. The transverse axes 13 of the upper forming tool set (3) is horizontal, whilst the second transverse axes (14), that of the lower forming tool set is vertical. Whilst only one lead in zone 26 is shown on the upper forming tool set, it is to be understood that the lower forming tool set (4) may also have a lead in, and optionally a lead out zone. In other embodiments the lead in zone may be on the lower forming tool set (4).

In a further embodiment the forming tools sets both form substantially planar parallel conveyance systems as shown in FIG. 21*i*. Both sets of forming tools recirculate about a substantially parallel planes to each other (in this case horizontal). As shown only the upper forming tool set (3) has a lead in and lead out zone (optional), however it is to be understood that the lower forming tool set (4) may be a lead in zone also, and optionally a lead out zone. Alternatively the lower forming tool set (4) may have the only lead in zone and optional lead out zone.

The apparatus can be used to make a roofing material, substrate or tile 200 in continuous or non-continuous lengths. The preferred material is thermoplastic polyurethane that is extruded onto the lower of the two sets of forming tools. The material then passes through the pressure forming zone and the roofing tile 200 is forming by co-action of upper and lower forming tools that have the plan shape of the tile 200 machined into them. The profile may be machined into only the upper forming tools (the lower being blank) or vice versa or may be part machined into both sets of forming tools. Texture 201 may also be added at least on the upper or outward presenting surface of the tile 200 to simulate at least from a distance stones or similar texturing. The tile 200 may be coloured in any way desirable. The forming apparatus preferably runs at 1.8 to 2 kg/square centimeter (kg/cm2) pressure and 25-36 meters/min (m/min) speed in the machine direction.

A roof flashing 202 with fluted or sinusoidal edges (with or without any underlying shape retaining material, though preferably with) can also be manufactured from the same material with the same feeds and speeds. In the preferred embodiment the extruded thermo plastic poly urethane 203 is extruded onto an adhesive 204 and expanded mesh substrate 205 and this lay-up then passes through the pressure forming zone to bond the lay up together. In this application no forming heat is needed, save to retain suppleness until formed, and the main function of the pressure forming zone is forming and subsequent cooling.

In another embodiment the method and apparatus is used to form a liquid crystal display substrate 210. In one preferred embodiment the display substrate 210 is imprinted by said forming tools to produce channels 211 of 100 micrometers depth and 200 micrometers width. In another embodiment the display substrate has imprinted on at least one side elliptical in plan form depressions 212 of 100 micrometers deep by 200 micrometers wide. The display substrate is selected from any one or more of polycarbonate (PC), polymethyl methacrylate (PMMA), or general purpose polystyrene (GPPS). In other embodiments further materials to form an at least in part assembled display are added, for example between subsequent forming operations using the apparatus and method, e.g. addition of the liquid crystal, conducting elements and covers.

For such fine textures in the sub-millimeter dimension the surface tool 28 is often a fine screen that may be produced by etching or similar, known as a stamper die. This is then attached to the carrier tool 25 or an intermediate tool 250. The attachment of the surface tool 28 to the intermediate tool 250 may be by an adhesion or bonding layer 251. This may be formed by adhesive, soldering, brazing or electromagnetic, vacuum or electrostatic attraction techniques. In alternative embodiments the stamper die may be attached by mechanical fastening means, e.g. but not limited to clamping, bolting. The intermediate tool 250 may be made of copper for thermal reasons.

In a further embodiment the method and apparatus can be used to form a container 213 by vacuum forming 214 (or pressure forming, or co-acting mould forming) a thermoformable material (either whilst still deformable from being extruded or heated up and then deformed). The thermoforming preferably occurs in the pressure forming zone. In the pressure forming zone also as the formed container progresses in the machine direction the container is filled 215 with whatever product is to go in the container; for example, but not exhaustive or limiting are food stuffs (e.g. liquid or semi liquid and dried foods), chemicals, discrete products (e.g. nuts bolts) and similar. The filling can occur from the upper forming tools. After filling the container a sealing member 216 is applied, for example by heat sealing.

In a further embodiment the method and apparatus can be used to form a photovoltaic cell. The method runs on a continuous lower forming tool set 217 into which are formed moulds 220. There is a first upper forming tool set 218 with complimentary moulds 221 to those 220 of the lower forming tool base 217. When a base material 62A is introduced (for example but not limited to extrusion of a plastic) this is formed into a series of cell bases 222 by the co-action of the upper and lower forming tools. After the cell base 222 is formed it moves out from action of the first upper forming tool set 218 to a pick and place 223 zone where the conductive layers and photovoltaic elements 224 are located in the cell base. There after the assembly moves onto the second of the two upper forming tool sets 219 to have a further material 62B over moulded to form the sealed photo voltaic cell.

In a further embodiment the method and apparatus can be used to manufacture optical media such as CD's and DVDs, whether blank or pre-recorded. A such as but not limited to poly carbonate 62 (but may also be PMMA, GPPS, or a TPU) is extruded onto the lower forming tool set 226. In the preferred embodiment this has the blank shape moulds 227 for the optical media in it. An upper forming tool set 225 compresses the extruded material 62 into the moulds and also imprints, if required, the data into the data layer of the optical media. As the formed optical media traverses the pressure forming zone 27 the centre aperture is knocked out. Further materials and layers can be added within this pressure forming layer, or further upper tools set can be present to do so. The machine direction speed is up to 5 m/min and the pressure applied to the molten material 62 is 30 kg/cm2. Alternatively the material can be introduced through the upper or lower tool set to form the media in a corresponding mould as they co-acting tools close.

The advantage of the method and apparatus is the linear approach and removal of co-acting tools with no shear between them present. This extends the tool life, particularly when the data is stamped into the material. Furthermore with a multi-up tool across the forming tools the forming rates are much higher than the prior art methods of forming optical media. Additionally as the optical media material is layered on a in a very low stress state there optical media is produced with high final clarity and low rejection rate.

The foregoing description to the invention includes preferred forms thereof. Modifications may be made thereto without departing from the scope of the invention.

What is claimed is:

1. A method of forming a material, said method comprising the steps of:
   a. presenting a formable material to a space between opposing forming surfaces of opposed forming tools from whence said material is carried as said opposing forming surfaces advance in a machine direction,
   b. pressurising, as said opposing forming surfaces advance, said material between said opposing forming surfaces in a reduced space between said opposing forming surfaces defining at least in part a pressure forming zone, said reduced space between said opposing forming surfaces being maintained constant until a form of at least one of said opposing forming surfaces is profiled into said material and is retainable thereon, and
   c. releasing the profiled material from between the said opposing forming surfaces, as the space of the pressure forming zone increases between said opposing forming surfaces as the opposing forming surfaces advance,
   wherein each of said opposing forming surfaces, is provided by one or more forming tool(s) of a set of forming tools being advanced about its own guiding circuit, said set of forming tools being advanced about its own guiding circuit at least in part by driving action on one or more said forming tools by a driving means,
   and wherein as said forming tools present in a zone to pressurise or release said material there is no gap between adjacent said forming tools at least where they contact said forming material, and the relative movement between adjacent tools of at least one of said set of forming tools over said zone is only towards or away from the forming tools of said other opposing forming surface, and wherein at least one of said sets of forming tools and said guiding circuits is moveable relative to the other set of forming tools and guiding circuit so as to effect opening or closing of said forming tools and opposing forming surfaces of said pressure forming zone to at least vary the pressure in said pressure forming zone.

2. A method of forming a material as claimed in claim 1 wherein said guiding circuit is endless.

3. A method of forming a material as claimed in claim 1 wherein said guiding circuit is-comprises a takeout point to allow insertion and removal of said forming tools.

4. A method of forming a material as claimed in claim 1 wherein said driving action is generated by a motor.

5. A method of forming a material as claimed in claim 1 wherein in said guiding circuit, said set of forming tools is advanced serially about said guiding circuit at least in part by one or more said forming tools being shunted by a trailing forming tool through said pressure forming zone where said step (b) pressurising takes place.

6. A method of forming a material as claimed in claim 1 wherein in said pressure forming zone, where said step (b) pressurising takes place, each of said forming tools is supported on one or more guide tracks of said guiding circuit acting on two axes of each said forming tool on its flanks transverse to said machine direction, to set the forming tool in said pressure forming zone.

7. A method of forming a material as claimed in claim 1 wherein in said guiding circuit, said set of forming tools, is advanced serially about said guiding circuit by each said forming tool being pushed over at least part of said guiding circuit under said driving action directly on just one or a few of said forming tools in said set of forming tools.

8. A method of forming a material as claimed in claim 7 wherein in said guiding circuit, said set of forming tools, is permitted, by a differential of locus of said guide tracks at each flank of each forming tool at one or more lead zones to vary from an aligned condition of adjacent forming tools required through the pressure forming zone.

9. A method of forming a material as claimed in claim 7 wherein each said forming tool comprises at least one carrier tool that runs in or on said one or more guide tracks of said guiding circuit and at least one surface tool to provide at least one of said opposing forming surfaces, said surface tool mounted to or from said carrier tool to be carried thereby.

10. A method of forming a material as claimed in claim 9 wherein each forming tool, or said carrier tool carrying said surface tool, has at least two follower sets, one set engaged only during when said tool is in the pressure forming zone, and a further set thereafter used to guide said tool about the remainder of said guiding circuit.

11. A method of forming a material as claimed in claim 1 wherein in said pressure forming zone where the step (b) pressurising takes place, one said set of forming tools present surfaces downwardly whilst an underlying said set of forming tools present surfaces upwardly.

12. A method of forming a material as claimed in claim 1 wherein said material is introduced together with a further material, whether formable or not.

13. A method of forming a material as claimed in claim 1 wherein said material is anyone or more of:
a. a plastic material,
b. a material introduced in a liquid or semi-liquid form, or
c. a material introduced in an extrude form.

14. A method of forming a material as claimed in claim 1 wherein said profile is imprinted on one side of said material.

15. A method of forming a material as claimed in claim 1 wherein said profile is imprinted on both sides of said material.

16. A method of forming a material as claimed in claim 1 wherein there is a plurality of said pressure forming zones with said material being further treated in between said multiple pressure forming zones of said plurality of said pressure forming zones.

17. A method of forming a material as claimed in claim 16 wherein said material or materials are added between or in said pressure forming zones of said plurality of said pressure forming zones.

18. A method of forming a material as claimed in claim 1 wherein said material or materials comprises:
a. a molten mouldable material,
b. a thermoformable material presented at a thermoformable temperature,
c. a thermoformable material to be heated by the forming tools to a formable condition,
d. a thermoformable material or molten mouldable material to be cooled by the forming tools or otherwise, and
e. a thermoformable material to be thermoset by the forming tools.

19. A method of forming a material as claimed in claim 1 wherein said opposing forming surfaces apply from 0.0 kg/cm$^2$ to 250 kg/cm$^2$ to said material therebetween.

20. A method of forming a material as claimed in claim 1 wherein said opposing forming surfaces move from 0.0 m/min to 300 m/min in said machine direction.

21. A method of forming a material as claimed in claim 1 wherein said space between said opposing forming surfaces is adjustable from 1 micrometer up to 10 meters.

22. A method of forming a material as claimed in claim 1 wherein said material is extruded onto one of said opposing forming surfaces immediately prior to said pressure forming zone.

23. A method of forming a material as claimed in claim 1 wherein said material is formed into a photovoltaic cell.

24. A method of forming a material as claimed in claim 23 wherein said material is a base material and in step b) the base material is formed in said pressure forming zone to comprise a series of cell bases, and said method comprises:
d. locating a conductive layer or layers in said cell bases,
e. locating photo voltaic elements on said conductive layer(s), and
f. forming and locating a cover to at least in part seal the resultant assembly.

25. A method of forming a material as claimed in claim 24 wherein said photovoltaic elements are chosen from any one of more of a silicon, thin film or die sensitised material.

26. A method of forming a material as claimed in claim 24 wherein said cover seals said resultant assembly.

27. A method of forming a material as claimed in claim 24 wherein said base material is selected from any one or more of a polymer (whether crystalline or otherwise), steel or glass.

28. A method of forming a material as claimed in claim 23 wherein said forming occurs between a plurality of upper said sets of forming tools and a common lower said set of forming tool set.

29. A method of forming a material as claimed in claim 23 wherein said forming occurs on two separate upper said forming tools sets, interrupted by location of said conductive layers and photovoltaic elements in said cell bases.

30. A method of forming a material as claimed in claim 23 wherein said opposing forming surfaces can move from 0.1 m/min to 27 m/min in said machine direction.

31. A method of forming a material as claimed in claim 23 wherein said opposing forming surfaces apply pressure in a range of between 20 kg/cm$^2$ to 25 kg/cm$^2$ in the first of said upper forming tool sets and between 0.1 kg/cm$^2$ to 5 kg/cm$^2$ in the second of said upper forming tool sets.

* * * * *